US012594573B2

(12) United States Patent
Lee et al.

(10) Patent No.: US 12,594,573 B2
(45) Date of Patent: Apr. 7, 2026

(54) DIE COATER AND INSPECTION DEVICE THEREOF

(71) Applicant: LG Energy Solution, Ltd., Seoul (KR)

(72) Inventors: Do Hyun Lee, Daejeon (KR); Seong Su Park, Daejeon (KR); Myung Han Lee, Daejeon (KR); Duck Joong Yun, Daejeon (KR); Woo Jin An, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 528 days.

(21) Appl. No.: 17/917,707

(22) PCT Filed: Jul. 7, 2021

(86) PCT No.: PCT/KR2021/008655
§ 371 (c)(1),
(2) Date: Oct. 7, 2022

(87) PCT Pub. No.: WO2022/014945
PCT Pub. Date: Jan. 20, 2022

(65) Prior Publication Data
US 2023/0173527 A1 Jun. 8, 2023

(30) Foreign Application Priority Data

Jul. 14, 2020 (KR) ........................ 10-2020-0087146
Jun. 29, 2021 (KR) ........................ 10-2021-0085160

(51) Int. Cl.
*B05C 5/00* (2006.01)
*B05C 5/02* (2006.01)
(Continued)

(52) U.S. Cl.
CPC ............ *B05C 5/0254* (2013.01); *B05C 11/10* (2013.01); *H01M 4/04* (2013.01)

(58) Field of Classification Search
CPC ................................. B05C 11/10; H01M 4/04
See application file for complete search history.

(56) References Cited

U.S. PATENT DOCUMENTS 6,344,088 B1 2/2002 Kamikihara et al.
7,033,644 B2 4/2006 Tokimasa et al.
(Continued)

FOREIGN PATENT DOCUMENTS

CN 102259076 A 11/2011
CN 103286040 A 9/2013
(Continued)

OTHER PUBLICATIONS

Extended European Search Report including Written Opinion for Application No. 21842757.3 dated Jan. 26, 2024, pp. 1-8.
(Continued)

*Primary Examiner* — Jamel E Williams
(74) *Attorney, Agent, or Firm* — Lerner David LLP

(57) ABSTRACT
A device for inspecting a die coater including a first die, a second die, and a shim formed between the first die and the second die, includes a rail formed to be fixed long on one surface of the first die in a longitudinal direction of the die coater, and at least one sensor assembly configured to move along the rail and inspect a lip or the shim of the die coater, wherein the sensor assembly includes a movable part moving along the rail in the longitudinal direction of the die coater, and a sensor module connected to the movable part, and configured to move in a thickness direction of the die coater and inspect the lip or the shim.

20 Claims, 14 Drawing Sheets

(51) Int. Cl.
B05C 11/10       (2006.01)
H01M 4/04       (2006.01)

(56)              References Cited

U.S. PATENT DOCUMENTS

| | | | |
|---|---|---|---|
| 2002/0023584 A1 | 2/2002 | Mandai et al. |
| 2003/0157252 A1 | 8/2003 | Tokimasa et al. |
| 2004/0197466 A1 | 10/2004 | Tokimasa et al. |
| 2007/0092655 A1 | 4/2007 | Tokimasa et al. |
| 2011/0287171 A1 | 11/2011 | Seo et al. |

FOREIGN PATENT DOCUMENTS

| | | |
|---|---|---|
| CN | 204892279 U | 12/2015 |
| CN | 207343186 U | 5/2018 |
| CN | 210036598 U | 2/2020 |

| | | | | | |
|---|---|---|---|---|---|
| DE | 10133582 A1 | * | 1/2002 | ........... B05C 5/0254 |
| EP | 0547562 B1 | * | 3/1997 | |
| JP | H0994057 A | | 4/1997 | |
| JP | H09248513 A | | 9/1997 | |
| JP | H10337519 A | | 12/1998 | |
| JP | H11156269 A | | 6/1999 | |
| JP | 2000334357 A | * | 12/2000 | |
| JP | 2002018340 A | | 1/2002 | |
| JP | 2003275652 A | | 9/2003 | |
| JP | 2009174957 A | | 8/2009 | |
| JP | 2017212097 A | | 11/2017 | |
| KR | 20130128912 A | | 11/2013 | |

OTHER PUBLICATIONS

International Search Report for Application No. PCT/KR2021/008655 mailed Oct. 18, 2021, pp. 1-3.

* cited by examiner

START

MOVE SENSOR MODULE — S301

DETECT EDGE — S302

RECOGNIZE COORDINATE VALUE OF EDGE — S303

DERIVE COORDINATE OF LIP OR SHIM — S304

MEASURE HEIGHT AT CORRESPONDING
COORDINATES BY SENSOR MODULE — S305

DETERMINE WHETHER DIE COATER IS DEFECTIVE — S306

END 222    234    223    233    221

DIE COATER AND INSPECTION DEVICE THEREOF

CROSS-REFERENCE TO RELATED APPLICATION

The present application is a national phase entry under 35 U.S.C. §371 of International Application No. PCT/KR2021/008655 filed Jul. 7, 2021, which claims priority from Korean Patent Application Nos. 10-2020-0087146, filed on Jul. 14, 2020, and 10-2021-0085160, filed on Jun. 29, 2021, in the Korean Intellectual Property Office, all of which are incorporated herein by reference.

TECHNICAL FIELD

The present disclosure relates to a die coater and an inspection device thereof, and more specifically, to a die coater in which a position of a lip may be precisely measured to determine whether assembly defects of a die and a shim occur, and an inspection may be immediately performed when the die coater is in the state of being mounted on a production line without providing a separate inspection line, and an inspection device thereof.

BACKGROUND ART

In general, types of a secondary battery include a nickel cadmium battery, a nickel hydrogen battery, a lithium ion battery, a lithium ion polymer battery, and the like. Such a secondary battery is applied and used in small products such as digital cameras, P-DVDs, MP3P, mobile phones, PDAs, portable game devices, power tools, and e-bikes, as well as large products that require high power such as electric vehicles and hybrid vehicles, and power storage devices for storing surplus generated power or renewable energy, and power storage devices for backup power.

In order to manufacture the above secondary battery, electrode active material slurry is first applied on a positive electrode collector and a negative electrode collector to manufacture a positive electrode and a negative electrode, and the positive electrode and the negative electrode are stacked on both sides of a separator to form an electrode assembly having a predetermined shape. Then, the electrode assembly is accommodated in a battery case, followed by injecting an electrolyte thereto, and sealing.

An electrode such as a positive electrode and a negative electrode may be manufactured by applying slurry prepared by mixing an electrode active material, a binder, and a plasticizer with an electrode collector on an electrode collector such as a positive electrode collector and a negative electrode collector, and then drying and pressing the same. In order to apply such slurry on an electrode collector, a die coater is used.

A die coater generally includes a first die, a shim, and a second die, may be formed by assembling the first die and the second die with the shim interposed between the first die and the second die. At this time, a third die may be further provided between the first die and the second die, in which case a first shim may be interposed between the first die and the third die and a second shim may be interposed between the second die and the third die. That is, a die coater may include dies and shims in various numbers.

The die coater has a very narrow gap between discharge ports through which the slurry and the like are discharged. However, when such a gap differs from a designed gap due to an assembly tolerance or the like, the amount of slurry applied on an electrode collector and the like will greatly differ from a designed value. In that case, the quality of a manufactured electrode may be different from designed quality.

Alternatively, if a die coater is used for a long time once it is assembled, a die and a shim may be dissembled and then reassembled for internal cleaning or the like. However, in such a process, the positions of a first lip of the first die, a guide of the shim, a second lip of the second die may be deviated from their original positions. Then, even when the same die coater is used to manufacture an electrode, the quality of the electrode before and after the reassembly may be different.

Therefore, in order to reduce an assembly tolerance and the like, a user allows a lip of a die coater to be indirect contact with a micrometer so as to measure the height of a first lip, a shim, and a second lip and gaps therebetween. However, since the gap of a discharge port between such lips is very narrow, it is not easy for the user to make a direct contact therewith to perform measurement, and there is also a problem of increasing in errors due to different measurement results by each user.

DISCLOSURE OF THE INVENTION

Technical Problem

An object to be achieved by the present technology is to provide a die coater in which a position of a lip may be precisely measured to determine whether an assembly of a die and a shim is defective and an inspection may be immediately performed when the die coater is in the state of being mounted on a production line without providing a separate inspection line, and an inspection device thereof.

The objects of the present invention are not limited to the aforementioned object, but other objects not described herein will be clearly understood by those skilled in the art from descriptions below.

Technical Solution

A device for inspecting a die coater including a first die, a second die, and a shim formed between the first die and the second die according to an embodiment of the present invention for solving the above problems includes a rail formed to be fixed long on one surface of the first die in a longitudinal direction of the die coater, and at least one sensor assembly configured to move along the rail and inspect a lip or the shim of the die coater, wherein the sensor assembly includes a movable part moving along the rail in the longitudinal direction of the die coater, and a sensor module connected to the movable part, and configured to move in a thickness direction of the die coater and inspect the lip or the shim In addition, the sensor module may include a position detection sensor configured to detect the position of the lip, and a distance detection sensor configured to measure the height of the lip or the shim In addition, the position detection sensor and the distance detection sensor may be disposed in parallel to each other in the longitudinal direction of the die coater.

In addition, the position detection sensor may include at least one of a fiber optic sensor, a photo sensor, a proximity sensor, or a vision sensor, and the distance detection sensor may include at least one of a laser displacement sensor or an ultrasonic displacement sensor.

In addition, the shim may include at least one guide configured to divide an internal space between the first die and the second die into a plurality of spaces, and a base connecting ends of the guide to each other and extending in a longitudinal direction of the die coater.

In addition, the position detection sensor may move along a first path in which the guide is not present, and the distance detection sensor may move along a second path in which the guide is present.

In addition, the sensor module may move in a direction from the first die to the second die.

In addition, a control part configured to control the operation of the sensor assembly, and a storage part in which reference data on the thickness of the lip or the shim is stored may be further included.

In addition, the control part may include a first encoder configured to recognize a coordinate value of the sensor module whenever the sensor module moves in the thickness direction of the die coater, a reception part configured to receive a signal transmitted by the position detection sensor, a determination part configured to determine the position of the lip or the shim according to the signal received by the reception part, and a calculation part configured to perform calculation based on the position of the lip or the shim and the coordinate value to derive a coordinate value of the lip or a coordinate value of the shim In addition, the position detection sensor may change a signal transmitted to the reception part from a first signal to a second signal, when detecting an edge of the lip.

In addition, the first encoder may recognize the coordinate value of the sensor module as a coordinate value of the edge, when the first signal is changed to the second signal.

In addition, the storage part may store the coordinate value of the edge recognized by the first encoder.

In addition, the determination part may determine the position of the lip or the shim using the edge as a boundary, when the reception part receives the second signal.

In addition, the calculation part may load the reference data on the thickness of the lip or the shim from the storage part and calculate reference data on the coordinate value of the edge and the thickness of the lip or the shim by reflecting the position of the lip or the shim to derive the coordinate value of the lip or the shim In addition, the calculation part may calculate half of the thickness of the lip or the shim to the coordinate value of the edge to derive the coordinate value of the lip or the shim In addition, the storage part may store the derived coordinate value of the lip or the shim In addition, the sensor module may move to a position corresponding to the derived coordinate value of the lip or the shim In addition, the distance detection sensor may measure the height of the lip or the shim at the position corresponding to the coordinate value of the lip or the shim In addition, the storage part may store measurement data on the height of the lip or the shim In addition, the storage part may have reference data on the height of the lip or the shim stored therein.

In addition, the determination part may compare the measurement data on the height of the lip or the shim with the reference data on the height of the lip or the shim to determine whether defects occur.

In addition, the control part may further include a second encoder configured to recognize a coordinate value of the movable part whenever the movable part moves along the rail in the longitudinal direction of may be coater.

In addition, the rail may be formed to be coupled to one surface of the first die.

In addition, the rail may be integrally formed on one surface of the first die.

In addition, the rail may be formed to be embedded on one surface of the first die.

In addition, the sensor assembly may be provided in plurality.

In addition, a height of the sensor module may be less than a gap between the lip and a base material to be coated.

In addition, the movable part may include a rod configured to move the sensor assembly in a width direction of the die coater.

In addition, the movable part may include a rotatable part configured to rotate around an axis parallel to the longitudinal direction of the die coater.

In addition, the movable part may be detachable from the rail.

In addition, the sensor module may include a 2D line sensor configured to scan the die coater so as to two-dimensionally detect the shape of the lip and the shim in the width direction of the die coater, and an inspection part configured to compare a measured height value from an edge of the lip to an edge of the shim detected through the 2D line sensor with a set height value to inspect whether defects occur.

In addition, the inspection part may inspect the arrangement state of two or more dies using the shape of the lip and the shim detected through the 2D line sensor.

In addition, the inspection part may inspect whether the edge of the lip detected by the 2D line sensor is positioned on the same horizontal line.

In addition, the inspection part may measure the thickness of the shim using the edge of the lip and the edge of the shim detected through the 2D line sensor, and inspect a discharge gap through the thickness of the shim In addition, the 2D line sensor may scan the die coater every set time to continuously detect the shape of the edge of the lip and the shape of the edge of the shim, and the inspection part may inspect a degree of wear of the die and the shim by a change in position with respect to the edge of the lip or a change in position with respect to the edge of the shim continuously measured through the 2D line sensor.

In addition, the inspection part may be configured to inspect surface roughness by enlarging the shapes of the lip and the shim detected through the 2D line sensor.

A die coater according to an embodiment of the present invention for solving the above problem includes a first die and a second die configured to supply slurry to the outside, and a shim formed between the first die and the second die, wherein a rail is formed to be fixed long on one surface of the first die in a longitudinal direction.

In addition, the die coater may further include at least one sensor assembly configured to move along the rail and inspect a lip or the shim, and a control part configured to control the operation of the sensor assembly, wherein the sensor assembly may include a movable part moving along the rail in a longitudinal direction, and a sensor module connected to the movable part, and configured to move in a thickness direction, and configured to inspect the lip.

In addition, the sensor module may include a position detection sensor configured to detect the position of the lip, and a distance detection sensor configured to measure the height of the lip or the shim Other specific details of the present invention are included in the detailed description and drawings.

Advantageous Effects

According to the embodiments of the present technology, there are at least the following effects.

Since the die coater inspection device is formed on one surface of a first die of the die coater, there is no need for a user to perform measurement or separate setting, so that it is easy to measure the height, gap, and the like of a lip, and it is possible to reduce errors, thereby accurately determining whether an assembly of a die and a shim is defective.

In addition, it is possible to immediately inspect the die coater when the die coater is in the state of being mounted on a production line without moving the die coater to a separate inspection line, so that it is possible to reduce an inspection time and increase in production efficiency.

In addition, a die coater inspection device may automatically detect the position and height of the lip and the shim, the inspection may be easily performed, and the problem of increasing in errors due to the different measurement results by each user may be prevented.

The effects according to the present invention are not limited by the contents exemplified above, and more various effects are included herein.

MODE FOR CARRYING OUT THE INVENTION

Figure 1:
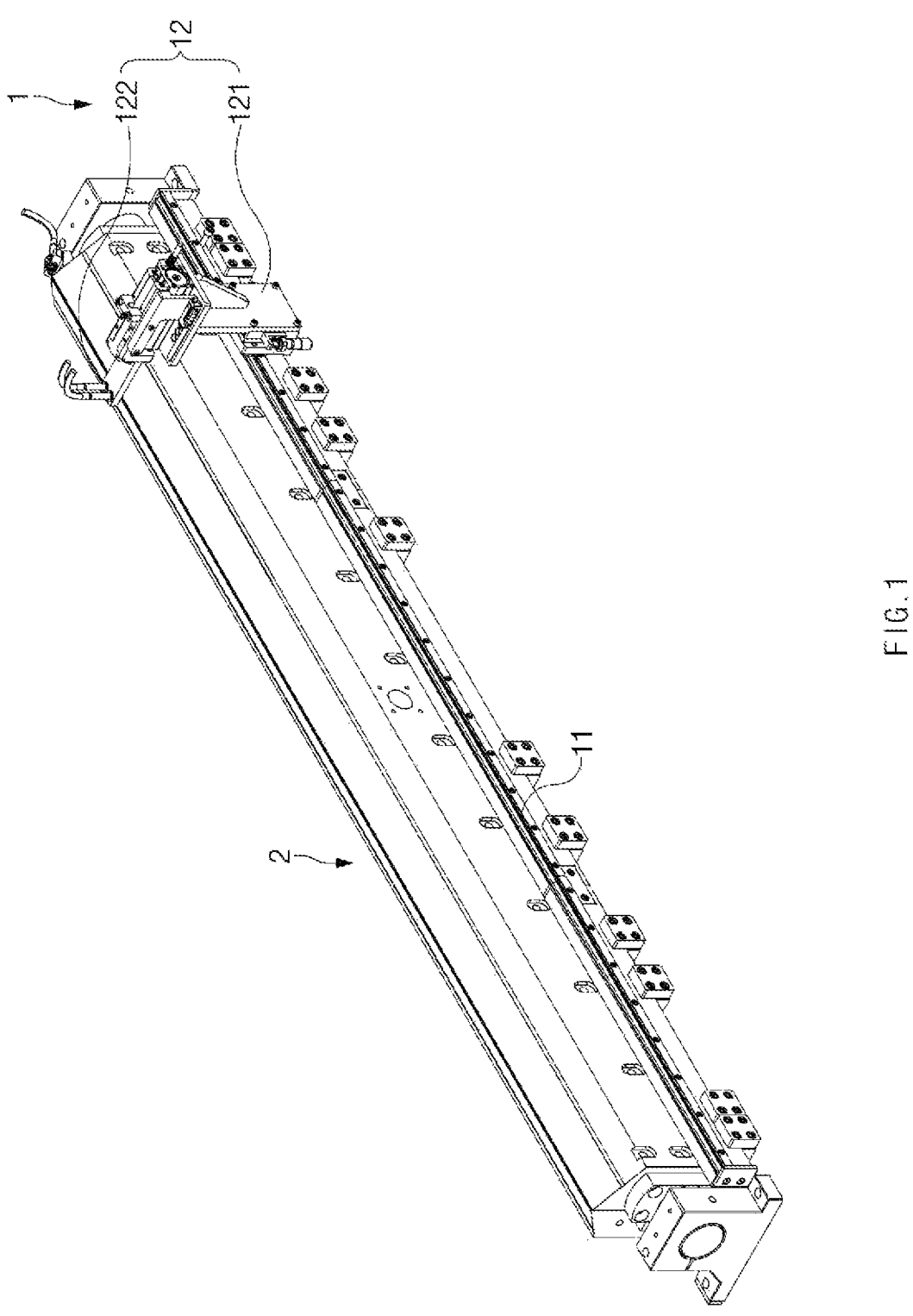
FIG. 1 is a perspective view of a die coater 2 and a die coater inspection device 1 according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless otherwise defined, all the terms used herein (including technical and scientific terms) will be used in a sense that can be commonly understood to those of ordinary skill in the art to which the inventive concept pertains. In addition, the terms that are defined in a commonly used dictionary are not interpreted ideally or excessively unless specifically defined.

The terms used herein are for the purpose of describing embodiments and are not intended to be limiting of the present invention. In the present disclosure, singular forms include plural forms unless the context clearly indicates otherwise. As used herein, the terms "comprises" and/or "comprising" are intended to be inclusive of the stated elements, and do not exclude the possibility of the presence or the addition of one or more other elements.

Hereinafter, preferred embodiments of the present invention will be described in detail with reference to the accompanying drawings.

FIG. 1 is a perspective view of a die coater 2 and a die coater inspection device 1 according to an embodiment of the present invention.

According to an embodiment of the present invention, the die coater inspection device 1 is formed on one surface of a first die 211 of the die coater 2, so that there is no need to allow a user to directly perform measurement or separate setting, it is easy to measure a height, a gap, and the like of a lip 22 (illustrated in FIG. 4), and it is possible to reduce errors, thereby accurately determining whether an assembly of a die 21 and a shim 23 (illustrated in FIG. 2) is defective. In addition, it is possible to immediately inspect the die coater 2 when the die coater 2 is in the state of being mounted on a production line without moving the die coater 2 to a separate inspection line, so that it is possible to reduce an inspection time and increase in production efficiency. In addition, the die coater inspection device 1 may automatically detect the positions and heights of the lip 22 and the shim 23, so that the inspection may be easily performed, and a problem of increasing in errors due to different measurement results by each user may be prevented.

To this end, in the device for inspecting the die coater 2 including the first die 211 (illustrated in FIG. 2), the second die 212 (illustrated in FIG. 2), and the shim 23 formed between the first die 211 and the second die 212, the die coater inspection device 1 according to an embodiment of the present invention includes a rail 11 formed to be fixed long on one surface of the first die 211 in a longitudinal direction of the die coater 2, and at least one sensor assembly 12 moving along the rail 11 and inspecting the lip 22 or the shim 23 of the die coater 2. Here, the sensor assembly 12 includes a movable part 121 moving along the rail 11 in the longitudinal direction of the die coater 2, and a sensor module 122 connected to the movable part 121, moving in a thickness direction of the die coater 2, and inspecting the lip 22 or the shim 23 of the die 21.

In addition, the die coater 2 according to an embodiment of the present invention includes the first die 211 and the second die 212 which supply slurry to the outside, and the shim 23 formed between the first die 211 and the second die 212. Here, the rail 11 is formed to be fixed long on one surface of the first die 211 in the longitudinal direction. In addition, at least one sensor assembly 12 moving along the rail 11 and inspecting the lip 22 or the shim 23, and a control part 13 configured to control an operation of the sensor assembly 12 are further included. Here, the sensor assembly 12 may include the movable part 121 moving along the rail 11 in the longitudinal direction, and the sensor module 122 connected to the movable part 121, moving in a thickness direction, and inspecting the lip 22.

The rail 11 is formed long in the longitudinal direction of the die coater 2. In addition, the movable part 121 of the sensor assembly 12 moves along the rail 11. The rail 11 is formed to be fixed on one surface of the first die 211, so that the die coater 2 and the rail 11 may not be easily separated or easily dislocated from each other. Therefore, there is no need to allow the user to directly measure the lip 22 of the die coater 2, or separate setting a sensor, so that the sensor assembly 12 may easily inspect the lip 22 or the shim 23 formed at a side of a discharge port of the die coater 2. In addition, since measurement results by each user are not different, the errors are reduced, and thus, it is possible to accurately determine whether the assembly of the die 21 and the shim 23 is defective. According to an embodiment of the present invention, the rail 11 may be formed to be coupled to one surface of the first die 211 through a separate coupling part (not shown) such as a bolt or a rivet, but is not limited thereto, and may be coupled to one surface of the first die 211 by various methods.

The sensor assembly 12 includes the movable part 121 moving along the rail 11 in the longitudinal direction of the die coater 2, and the sensor module 122 connected to the movable part 121 and inspecting the lip 22 or the shim 23 of the die 21.

The movable part 121 moves along the rail 11 in the longitudinal direction of the die coater 2, and particularly, the movable part 121 may slide and move along the rail 11. To this end, the rail 11 and the movable part 121 may be slidably coupled to each other, and furthermore, at least one of the rail 11 and the movable part 121 may have a wheel or a roller.

The sensor module 122 moves in the thickness direction of the die coater 2, and may inspect the lip 22 or the shim 23. As described above, when the height or the position of the lip 22 or the shim 23 differs from designed values due to an assembly tolerance or the like, the quality of a manufactured electrode may be different from designed quality. To this end, the sensor module 122 measures the height of the lip 22 or the shim 23, and may confirm whether the die coater 2 is defective or not through the size of the assembly tolerance. The sensor module 122 is connected to the movable part 121, and thus, also moves in the longitudinal direction of the die coater 2 when the movable part 121 moves along the rail 11. Therefore the straightness of the lip 22 or the shim 23 of the die 21 may be inspected. In addition, when the sensor module 122 inspects the lip 22 or the shim 23 of the die 21, the movable part 121 may move along the rail 11 and inspect the lip 22 or the shim 23 at various positions.

According to an embodiment of the present invention, the sensor module 122 includes a noncontact sensor, and inspects the height of the lip 22 or the shim 23. Therefore there is no need to allow a user to directly contact the lip 22, so that it is possible to prevent the problem in that errors occur. In addition, the sensor assembly 12 including the sensor module 122 moves along the rail 11, and the rail 11 is formed to be fixed on one surface of the first die 211, so that the sensor module 122 is not separated from the die coater 2. Therefore, it is possible to immediately inspect the die coater 2 when the die coater 2 is in the state of being mounted on a production line without performing a process of moving the die coater 2 to a separate inspection line to perform measurement, and then moving the same back to the production line, so that it is possible to reduce an inspection time and increase in production efficiency. The sensor module 122 will be described in detail later.

Figure 2:
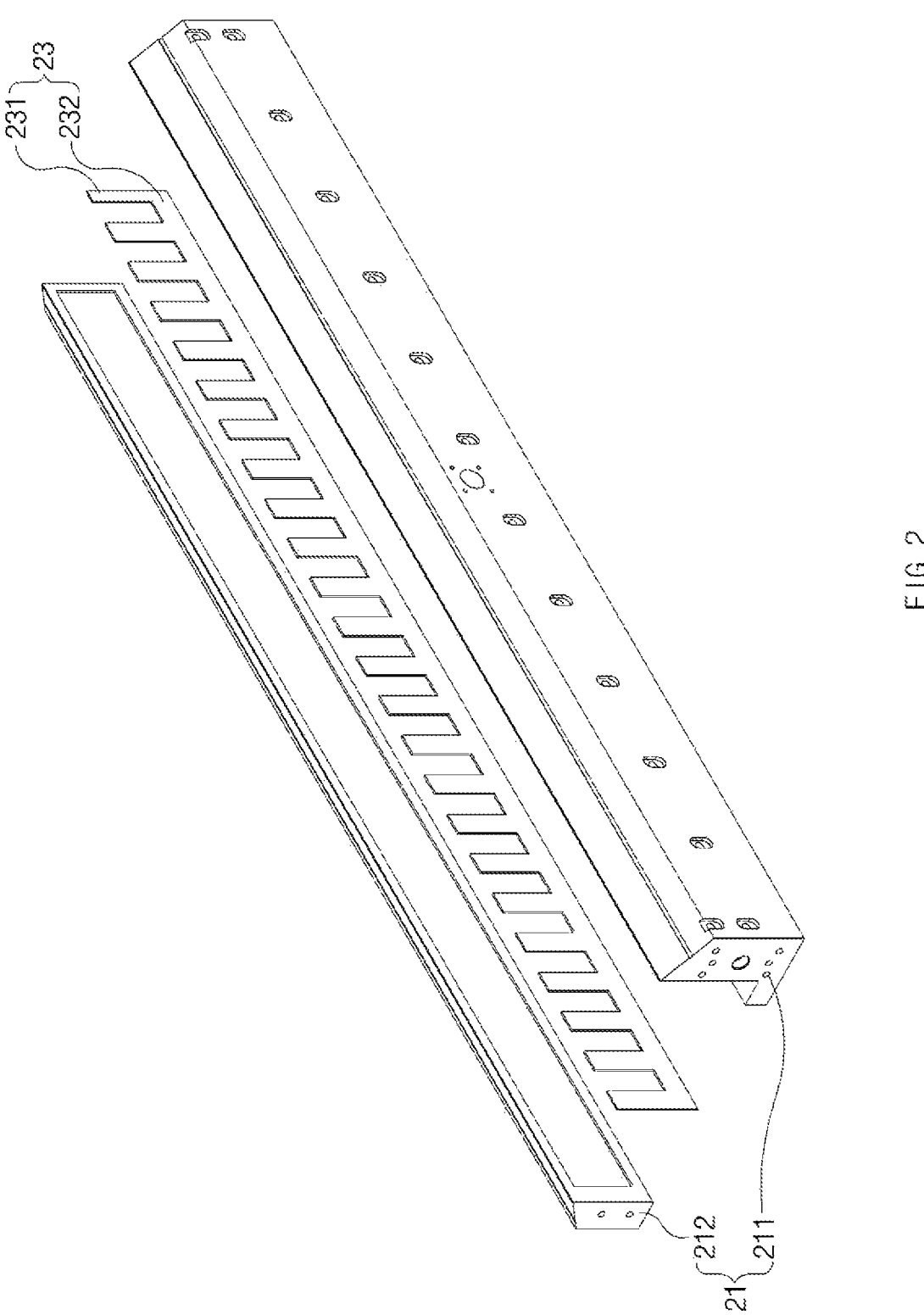
FIG. 2 is an assembly view of the die coater 2 according to an embodiment of the present invention.

FIG. 2 is an assembly view of the die coater 2 according to an embodiment of the present invention.

The die coater 2 is provided with slurry from the outside and then supplies the slurry to the outside, thereby applying the slurry on a base material such as an electrode collector long and continuously in a predetermined direction. To this end, the die coater 2 according to an embodiment of the present invention includes, as illustrated in FIG. 2, the first die 211 and the second die 212 which supply the slurry to the outside, and the shim 23 formed between the first die 211 and the second die 212, wherein the rail 11 is formed to be fixed long on one surface of the first die 211 in a longitudinal direction. Therefore the die coater 2 and the rail 11 may not be easily separated or easily dislocated from each other.

The die 21 applies slurry provided from the outside on at least one surface of a base material such as an electrode collector. At this time, as illustrated in FIG. 2, two dies 21 are formed, and the die coater 2 may be formed by assembling the first die 211 and the second die 212 with one shim 23 interposed between the first die 211 and the second die 212. However, the die coater 2 is not limited thereto, and may further include a third die 213 (illustrated in FIG. 4) between the first die 211 and the second die 212, in which case a first shim 233 (illustrated in FIG. 4) may be interposed between the first die 211 and the third die 213 and a second shim 234 (illustrated in FIG. 4) may be interposed between the second die 212 and the third die 213. That is, the number of dies 21 and shims 23 included in the die coater 2 are not limited thereto, but may vary.

As illustrated in FIG. 2, the first die 211 and the second die 212 have the shape of a truncated pyramid symmetrical to each other, and one surface of the first die 211 and the second die 212 corresponding to the bottom surface of the truncated pyramid are assembled to face each other. In addition, at least one of the first die 211 and the second die 212 may be provided with a supply hole (not shown) through which the slurry is supplied from the outside. The slurry supplied from the outside through the supply hole is stored in an internal space (not shown) formed inside the first die 211 and the second die 212.

If the die coater 2 further includes the third die 213, the third die 213 may have a thin rectangular plate shape. In addition, there are two shims 23 formed, and a first shim 233 is interposed between the first die 211 and the third die 213, and a second shim 234 is interposed between the second die 212 and the third die 213. In this case, both the first die 211 and the second die 212 may be formed in the supply hole (not shown), and a first internal space (not shown) may be formed inside the first die 211 and the third die 213, and a second internal space (not shown) may be formed inside the second die 212 and the third die 213. Therefore, the slurry supplied from the outside through each supply hole is stored in each of the first internal space and the second internal space.

The shim 23 for a die coater includes at least one guide 231 configured to divide an internal space between the first die 211 and the second die 212 into a plurality of spaces, and a base 232 connecting ends of the guide 231 to each other. The base 232 connects ends of at least one guide 231, thereby supporting a plurality of guides 231, and is formed extending from the ends of the at least one guides 231 in one side direction, particularly, in the longitudinal direction of the die coater 2. Therefore, the base 232 may be formed in a simple rectangular shape, but is not limited thereto, and may have various shapes to adjust an amount of applied slurry.

The at least one guide 231 has a predetermined width, and is formed to be in parallel to each other. In addition, an internal space for storing slurry is formed inside the die 21, and the guide 231 divides the internal space into a plurality of spaces. The slurry stored in the internal space flows inside the die coater 2 along the guide 231, and is discharged to the outside through a discharge port. The discharge port is formed thin and long, the die coater 2 and the base material move relative to each other at a constant rate, so that the slurry may be widely and uniformly applied on the base material.

When the slurry is discharged through the discharge port and applied on the base material, a non-coating portion, a portion of the base material which is not applied with the slurry, may be formed by the guide 231. Therefore the base material may be formed in a stripe pattern in which both the coating portion and the non-coating portion of the slurry are formed long in one direction while having a predetermined width. Since the coating portion and the non-coating portion are formed in such a stripe pattern, the non-coating portion becomes an electrode tab when a user cuts an electrode to an appropriate size later, so that it is easy to manufacture the electrode tab. In addition, by adjusting the width of the coating portion and the non-coating portion, the size of the electrode and the electrode tab may also be adjusted when cutting the electrode.

Hereinafter, the die coater 2 according to an embodiment of the present invention is described to have three dies 21 and two shims 23. However, this is for convenience of description, and is not intended to limit the scope of rights.

Figure 3:
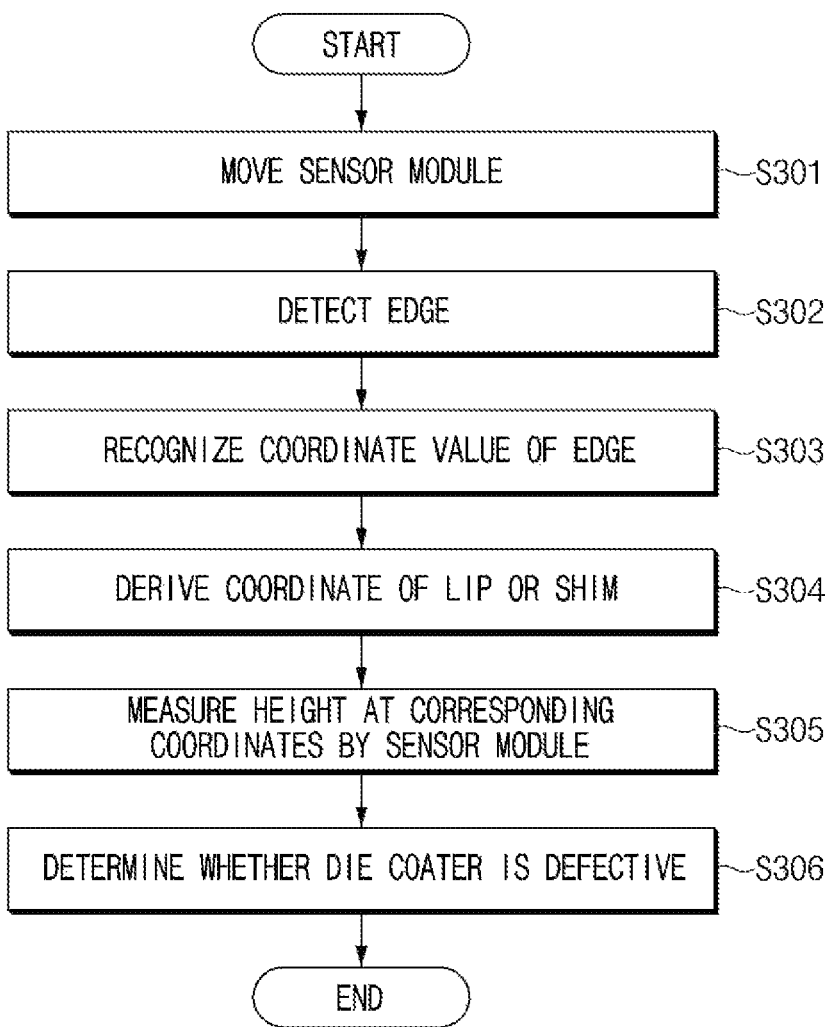
FIG. 3 is a flowchart of a die coater inspection method according to an embodiment of the present invention.

FIG. 3 is a flowchart of a die coater inspection method according to an embodiment of the present invention.

In the method for inspecting the die coater 2 including the first die 211, the second die 212, and the shim 23 formed between the first die 211 and the second die 212, a die coater inspection method according to an embodiment of the present invention using the above-described die coater inspection device 1 includes a process of moving the sensor module 122 including a position detection sensor 1221, a process of detecting an edge of the lip 22 of the die coater 2 by the position detection sensor 122, a process of recognizing a coordinate value of the edge, a process of calculating the coordinate value of the edge and reference data on the thickness 11 to 15 (illustrated in FIG. 6) of the lip 22 or the shim 23 to derive a coordinate value of the lip 22 or the shim 23, a process of moving the sensor module 122 to a position corresponding to the coordinate value of the lip 22 or the shim 23, a process of measuring the height of the lip 22 or the shim 23 by a distance detection sensor 1222 included in the sensor module 122, storing measurement data on the height of the lip 22 or the shim 23 in a storage part 14, and a process of determining whether the die coater 2 is defective based on the measurement data on the height of the lip 22 or the shim 23.

Hereinafter, each process illustrated in the flowchart of FIG. 3 will be described in detail with reference to FIG. 4 to FIG. 6.

Figure 4:
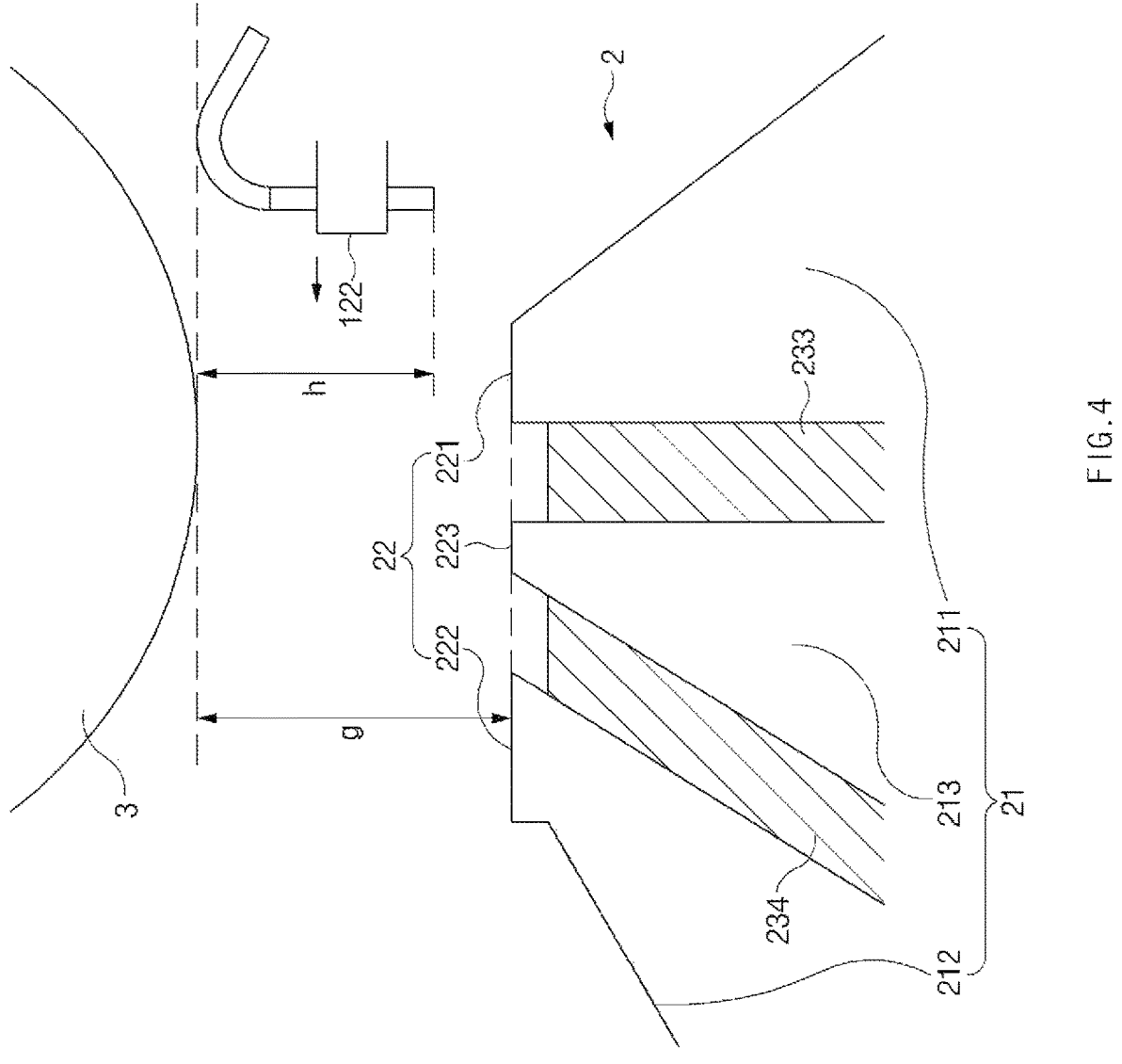
FIG. 4 is an enlarged side view of a lip 22 of the die coater 2 according to an embodiment of the present invention.

FIG. 4 is an enlarged side view of a lip 22 of the die coater 2 according to an embodiment of the present invention.

As described above, the sensor module 122 moves in the thickness direction of the die coater 2, and may inspect the lip 22 or the shim 23. According to an embodiment of the present invention, the sensor module 122 includes the position detection sensor 1221 configured to detect the position of the lip 22, and the distance detection sensor 1222 configured to measure the height of the lip 22 or the shim 23.

The position detection sensor 1221 recognizes the position of the lip 22 when the sensor module 122 moves in the thickness direction of the die coater 2, and in particular, may detect the position of the lip 22 by detecting an edge of the lip 22. The position detection sensor 1221 may include at least one of a fiber optic sensor, a photo sensor, a proximity sensor, or a vision sensor.

Particularly, the fiber optic sensor is manufactured using fiberglass, and is a sensor configured to detect a nearby object in a noncontact manner. In the optical fiber sensor, fiberglass itself may detect light, or if a separate element receives light, a fiberglass cable may transmit a signal for the received light. Unlike a typical photo sensor, the fiber optic sensor has a lens which may be removed, and thus, may be manufactured in an ultra-small size and may be easily installed in a narrow place. Examples of the fiber optic sensor include an optical time domain reflectometry (OTDR) sensor, an optical frequency domain reflectometry (OFDR) sensor, a brillouin optical time domain analysis (BOTDA) sensor, a brillouin optical correlation domain analysis (BOCDA) sensor, and the like.

As illustrated in FIG. 4, in general, a base material (not shown), which is a coating target on which the die coater 2 applies slurry, may be seated on a plane, but may be seated on a roll 3 and pass as illustrated in FIG. 4. At this time, if the thickness of the base material itself can be ignored, a gap g between the lip 22 of the die 21 and the base material is approximately 10 cm. Only when a height h of the sensor module 122 is less than the gap g between the lip 22 and the base material, the sensor module 122 may move in the thickness direction of the die coater 2 even when the die coater 2 is in the state of being mounted on a production line. Therefore, it is possible to immediately inspect the die coater 2 when the die coater 2 is in the state of being mounted on a production line without performing a process of moving the die coater 2 to a separate inspection line to perform measurement, and then moving the same back to the production line. Therefore, according to an embodiment of the present invention, the height h of the sensor module 122 may be less than the gap g between the lip 22 and the base material to be coated, and may be less than approximately 8 cm. In addition, it is preferable that the sensor module 122 moves between the lip 22 and the base material to be coated without being contacted or interfered by another component. Therefore, in order to control the above, the movable part 121 according to an embodiment of the present invention may include a rod for moving the sensor assembly 12 in a width direction of the die coater 2.

The position detection sensor 1221 according to an embodiment of the present invention may be manufactured in an ultra-small size, and detects the position of the lip 22 in a noncontact manner, and should detect the position of the lip 22 quickly and accurately even when the sensor module 122 is moving. To this end, it is preferable that the position detection sensor 1221 according to an embodiment of the present invention is a fiber optic sensor. Particularly, since it is not possible to install a sensor separately inside the die 21, a reflective sensor in which a light-transmitting part and a light-receiving part are not separately formed but all formed in one sensor body is preferable.

When a coordinate value of the lip 22 or the shim 23 is derived later, the distance detection sensor 1222 measures the height of the lip 22 or the shim 23 at a position corresponding to the coordinate value of the lip 22 or the shim 23. As the distance detection sensor 1222, a typical reflective displacement sensor may be used, and at least one of a laser displacement sensor and an ultrasonic displacement sensor may be included.

Particularly, when a laser transmitter transmits a laser, the laser displacement sensor measures a specific distance using the time taken until the laser is reflected by a corresponding object to return to be received. It is preferable that the distance detection sensor 1222 according to an embodiment of the present invention is a laser displacement sensor.

Figure 5:
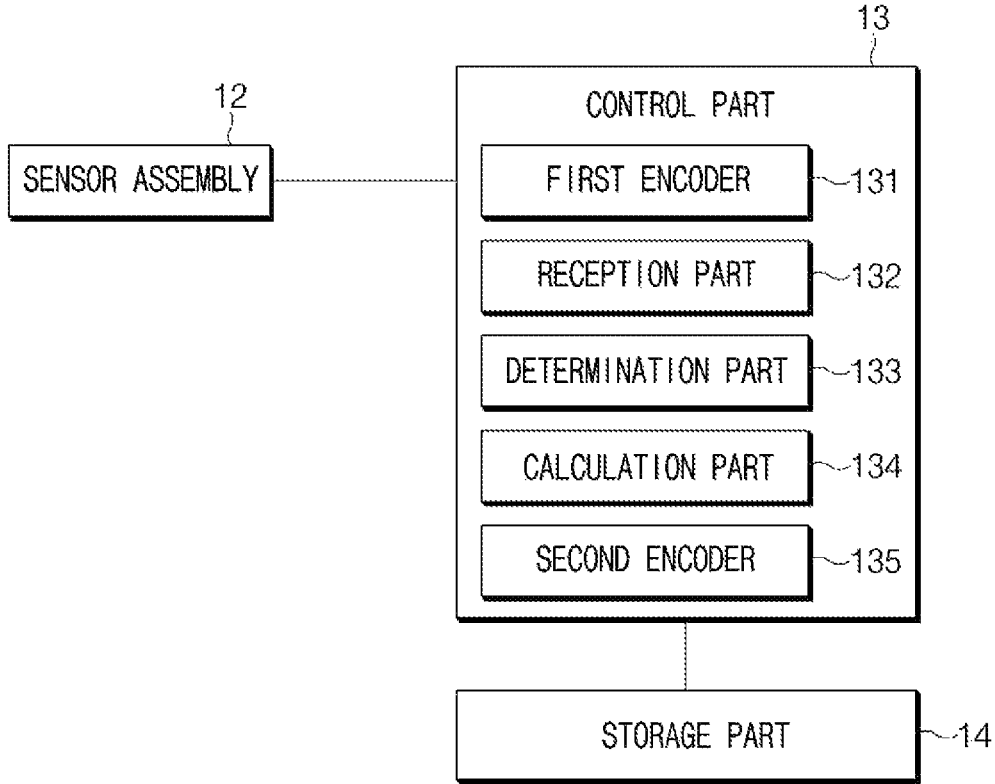
FIG. 5 is a block diagram of the die coater inspection device 1 according to an embodiment of the present invention.

FIG. 5 is a block diagram of the die coater inspection device 1 according to an embodiment of the present invention.

In the device for inspecting the die coater 2 including the first die 211, the second die 212, and the shim 23 formed between the first die 211 and the second die 212, the die coater inspection device 1 according to an embodiment of the present invention includes the sensor module 122 moving in the thickness direction of the die coater 2 and inspecting the lip 22 or the shim 23 of the die coater 2, the control part 13 configured to control the operation of the sensor module 122, and a storage part 14 in which reference data on the thickness 11 to 15 (illustrated in FIG. 6) of the lip 22 or the shim 23 is stored. Here, the sensor module 122 includes the position detection sensor 1221 configured to detect the position of the lip 22, and the distance detection sensor 1222 configured to measure the height of the lip 22 or the shim 23, and the control part 13 includes a first encoder 131 configured to recognize a coordinate value of the sensor module 122 whenever the sensor module 122 moves in the thickness direction of the die coater 2, a reception part 132 configured to receive a signal transmitted by the position detection sensor 1221, a determination part 133 configured to determine the position of the lip 22 or the shim 23, and a calculation part 134 configured to perform calculation based on the coordinate value to derive a coordinate value of the lip 22 or a coordinate value of the shim 23.

Upon receiving a signal from the sensor assembly 12, the control part 13 controls the operation of the sensor assembly 12 accordingly, that is, the operation of the sensor module 122 and the movable part 121, calculates a coordinate value of the lip 22 or the shim 23, and determines whether the die coater 2 is defective through the height of the lip 22 or the shim 23. The control part 13 includes the first encoder 131, the reception part 132, the determination part 133 and the calculation part 134. It is preferable that a central processing unit (CPU), a micro controller unit (MCU), a digital signal processor (DSP) or the like is used as the control part 13, but various logical operation processors may be used without being limited thereto.

The storage part 14 stores programs for processing and controlling operations of the die coater inspection device 1 and various data or received signals generated during the execution of each program. The storage part 14 stores reference data on the thickness 11 to 15 of the lip 22 or the shim 23, and also reference data on the height of the lip 22 or the shim 23. In addition, in the storage part 14, when the first encoder 131 recognizes a coordinate value of an edge, the coordinate value of the recognized edge is stored, and later when the calculation part 134 derives a coordinate value of the lip 22 or the shim 23, the coordinate value of the lip 22 or the shim 23 is stored, and when the distance detection sensor 1222 measures the height of the lip 22 or the shim 23, measurement data on the height of the lip 22 or the shim 23 is also stored. The storage part 14 may be embedded in the die coater inspection device 1, but may be provided as a separate storage server. The storage part 14 includes a non-volatile memory device and a volatile memory device. It is preferable that the non-volatile memory device is a NAND flash memory which is small in volume, lightweight, and resistant to external impacts, and the volatile memory device is a DDR SDRAM.

The first encoder 131 recognizes a coordinate value of the sensor module 122 whenever the sensor module 122 moves in the thickness direction of the die coater 2. It is preferable that the first encoder 131 recognizes the coordinate value of the sensor module 122 in real time, and at this time, the coordinate value may be recognized by detecting an amount of movement of the sensor module 122 and converting the amount into coordinates. The coordinate value may be relative coordinates measured based on arbitrarily selected criteria. Then, later, when a first signal transmitted to the reception part 132 by the position detection sensor 1221 is changed to a second signal, it means that the position detection sensor 1221 has detected an edge of the lip 22, so that the then coordinate value of the sensor module 122 may be recognized as a coordinate value of the edge.

The reception part 132 receives a signal transmitted by the position detection sensor 1221. The position detection sensor 1221 changes a first signal to be transmitted to the reception part 132 to a second signal when an edge of the lip 22 is detected. Therefore whether the edge of the lip 22 has been detected or not may be notified to the control part 13.

In accordance with a signal received by the reception part 132, the determination part 133 determines the position of the lip 22 or the shim 23 using the edge as a boundary. That is, based on the edge, whether the lip 22 or the shim 23 is positioned in front of the sensor module 122, and whether the lip 22 or the shim 23 is positioned at the rear of the sensor module 122 are determined. Here, the front refers to a direction in which the sensor module 122 moves, and the rear refers to a direction opposite to the direction in which the sensor module 122 moves. Then, later, when the distance detection sensor 1222 measures the height of the lip 22 or the shim 23, the measurement data on the height of the lip 22 or the shim 23 is compared with the reference data on the height of the lip 22 or the shim 23 to determine whether defects occur.

The calculation part 134 performs calculation based on the position of the lip 22 or the shim 23 and the coordinate value to derive a coordinate value of the lip 22 or a coordinate value of the shim 23. Specifically, the reference data on the thickness 11 to 15 of the lip 22 or the shim 23 is loaded from the storage part 14, and reference data on the coordinate value of the edge and the thickness 11 to 15 of the lip 22 or the shim 23 is calculated by reflecting the position of the lip 22 or the shim 23 to derive the coordinate value of the lip 22 or the shim 23. Particularly, the calculation part 134 calculates half of the thickness 11 to 15 of the lip 22 or the shim 23 to the coordinate value of the edge to derive the coordinate value of the lip 22 or the shim 23. At this time, the calculation varies depending on the position of the lip 22 or the shim 23. If the lip 22 is positioned in front of the sensor module 122 and the shim 23 is positioned at the rear thereof based on the edge, the calculation part 134 adds half of the thickness 11 to 13 of the lip 22 to the coordinate value of the edge to derive the coordinate value of the lip 22. Thereafter, the coordinate value of the shim 23 is derived by subtracting half of the thickness 14 and 15 of the shim 23 from the coordinate value of the edge.

The control part 13 may further include a second encoder 135. The second encoder 135 recognizes a coordinate value of the movable part 121 whenever the movable part 121 moves along the rail 11 in the longitudinal direction of the die coater 2. As described above, the sensor module 122 is connected to the movable part 121, and thus, also moves in the longitudinal direction of the die coater 2 when the movable part 121 moves along the rail 11. Therefore, the straightness of the lip 22 or the shim 23 of the die 21 may be inspected. At this time, the second encoder 135 may recognize a coordinate value of a portion at which straightness is poor by recognizing the coordinate value of the movable part 212. Alternatively, data on a coordinate value of a portion in which the guide 231 of the shim 23 is present and a coordinate value of a portion at which the guide 231 of the shim 23 is not present may be loaded, and the sensor module 122 may automatically move to the corresponding coordinate, and inspect an assembly tolerance and the like of the lip 22 or the shim 23. It is preferable that the second encoder 135 recognizes the coordinate value of the movable part 121 in real time, and at this time, the coordinate value may be recognized by detecting an amount of movement of the movable part 121 and converting the amount of movement into coordinates. The coordinate value may be relative coordinates measured based on arbitrary criteria.

Each element of the sensor assembly 12, the control part 13 and the storage part 14 described so far may be implemented by software such as tasks, classes, subroutines, processes, objects, execution threads, and programs executed in a predetermined region on a memory, hardware such as a field-programmable gate array (FPGA) or an application-specific integrated circuit (ASIC), or by a combination of the software and the hardware. The elements may be included in a computer-readable storage medium, or a portion thereof may be divided and distributed in a plurality of computers.

In addition, each block may represent a module, segment, or portion of a code including one or more executable instructions for executing specified logical functions. In addition, in some alternative embodiments, it is also possible for the above-mentioned functions to occur out of order in the blocks. For example, two blocks illustrated in succession may in fact be performed substantially simultaneously, and the blocks may sometimes be executed in reverse order according to corresponding functions.

Figure 6:
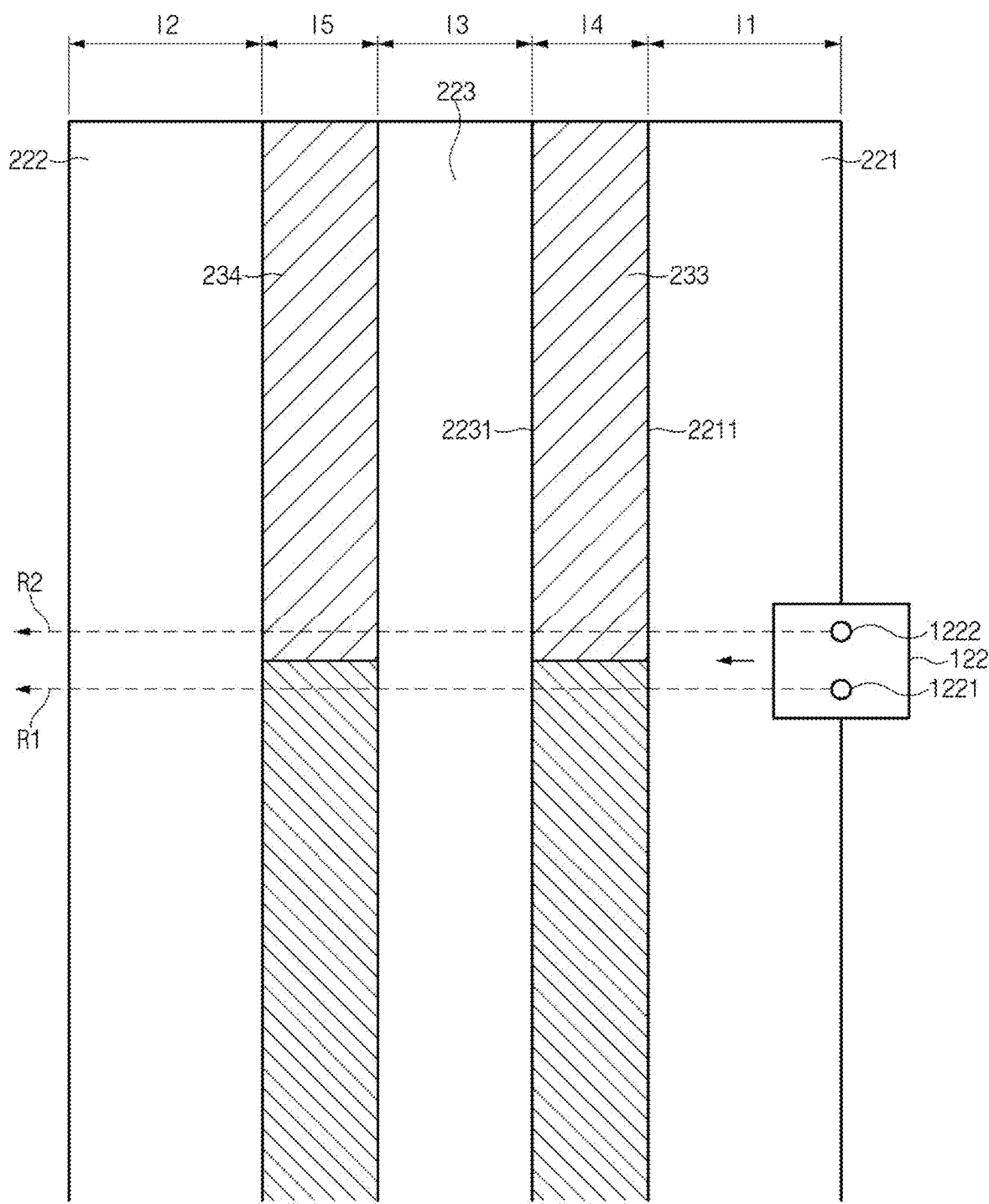
FIG. 6 is an enlarged top view of the lip 22 of the die coater 2 according to an embodiment of the present invention.

FIG. 6 is an enlarged top view of the lip 22 of the die coater 2 according to an embodiment of the present invention.

In order to perform a die coater inspection method using the above-described die coater inspection device 1, the sensor module 122 is first moved in the thickness direction of the die coater 2. As illustrated in FIG. 6, the sensor module 122 may move in a direction from the first die 211 to the second die 212.

The sensor module 122 includes the position detection sensor 1221 and the distance detection sensor 1222, and the position detection sensor 1221 and the distance detection sensor 1222 may be disposed in parallel to each other in the longitudinal direction of the die coater 2. In addition, as described above, the shim 23 for the die coater according to an embodiment of the present invention includes at least one guide 231. In addition, the sensor module 122 moves so as to pass through the guide 231, and at this time, in the sensor module 122, the position detection sensor 1221 may move along a first path R1 in which the guide 231 is not present, and the distance detection sensor 1222 may move along a second path R2 in which the guide 231 is present. Therefore the position detection sensor 1221 may recognize the edge of the lip 22 through the presence of the lip 22, and the distance detection sensor 1222 may measure the height of the lip 22 or the height of the shim 23. Here, the height of the shim 23 is preferably the height of the guide 231 of the shim 23.

While the sensor module 122 is moving in the thickness direction of the die coater 2, the position detection sensor 1221 detects the edge of the lip 22 S302. Then, the position detection sensor 1221 changes a signal transmitted to the reception part 132 of the control part 13 from a first signal to a second signal.

A fiber optic sensor or a photo sensor may be a reflective sensor or a light-receiving type sensor. The reflective sensor is a sensor in which both a light-transmitting part and a light-receiving part are formed in one sensor body, so that when an object is detected, light is received in the light-receiving part. In addition, the light-receiving type sensor is a sensor in which a light-transmitting unit and a light-receiving unit are prepared and installed facing each other, so that when the light-receiving unit detects an object while receiving light, the light being received by the light-receiving unit is blocked. As described above, since it is not possible to install a sensor separately inside the die 21, it is preferable that the position detection sensor 1221 according to an embodiment of the present invention is a reflective sensor.

Meanwhile, the first encoder 131 recognizes a coordinate value of the sensor module 122 whenever the sensor module 122 moves. When the reception part 132 of the control part 13 receives the second signal from the position detection sensor 1221, the first encoder 131 recognizes a coordinate value of the sensor module 122 as a coordinate value of the edge S303. Thereafter, the storage part 14 stores the coordinate value of the edge.

For example, as illustrated in FIG. 6, if the sensor module 122 moves while passing through an upper side of the first lip 221 of the first die 211, the position detection sensor 1221 detects the first lip 221, so that an on signal, which indicates that a light-receiving part receives light, is transmitted to the reception part 132 of the control part 13. However, when the sensor module 122 completely passes through the first lip 221, a space in which the first shim 233 is interposed between the first die 211 and the third die 213 without the presence of the first lip 221 appears. However, as described above, the position detection sensor 1221 moves along the first path R1 in which the guide 231 of the shim 23 is not present, so that the position detection sensor 1221 detects nothing. That is, since a light-receiving part of the position detection sensor 1221 does not receive light, an off signal is transmitted to the reception part 132. Therefore, a point at which the sensor module 122 passes the moment when the light-receiving part of the position detection sensor 1221 which has been receiving light no longer receives light is a first edge 2211 of the first lip 221. In addition, the moment when the signal transmitted by the position detection sensor 1221 to the reception part 132 is changed from the on signal to the off signal, the first encoder 131 recognizes a coordinate value of the sensor module 122 as a coordinate value of the first edge 2211. Here, the first signal is the on signal, and the second signal is the off signal. In addition, the storage part 14 stores the coordinate value of the first edge 2211.

On the other hand, if the sensor module 122 moves while passing through an upper side of the space in which the first shim 233 is interposed, the position detection sensor 1221 detects nothing, so that the off signal, which indicates that a light-receiving part does not receive light, is transmitted to the reception part 132 of the control part 13. However, when the sensor module 122 completely passes through the space in which the first shim 233 is interposed, a third lip 223 of the third die 213 appears. Then, the position detection sensor 1221 detects the third lip 223 and the light-receiving part receives light, the on signal is transmitted again to the reception part 132. Therefore, a point at which the sensor module 122 passes the moment when the light-receiving part of the position detection sensor 1221 which has not been receiving light receives light is a second edge 2231 of the third lip 223. In addition, the moment when the signal transmitted by the position detection sensor 1221 to the reception part 132 is changed from the off signal to the on signal, the first encoder 131 recognizes a coordinate value of the sensor module 122 as a coordinate value of the second edge 2231. Here, the first signal is the off signal, and the second signal is the on signal. In addition, the storage part 14 stores the coordinate value of the second edge 2231.

As in the above manner, the position detection sensor 1221 of the sensor module 122 may detect edges of the lip 22 of the die coater 2, and the storage part 14 may store coordinate values of the edges.

Meanwhile, when the reception part 132 of the control part 13 receives the second signal from the position detection sensor 1221, the determination part 133 determines the position of the lip 22 or the shim 23 based on the detected edge. For example, when a signal received by the reception part 132 is changed from the on signal to the off signal, it indicates that the position detection sensor 1221 has encountered a space in which the shim 23 is interposed while detecting the lip 23. Therefore, based on the edge, the shim 23 is positioned in front of the sensor module 122, and the lip 22 is positioned at the rear of the sensor module 122. On the other hand, when a signal received by the reception part 132 is changed from the off signal to the on signal, it indicates that the position detection sensor 1221 has detected the lip 22 after having passed through the space in which the shim 23 is interposed and detected nothing. Therefore, based on the edge, the lip 22 is positioned in front of the sensor module 122, and the shim 23 is positioned at the rear of the sensor module 122.

Furthermore, the determination part 133 determines whether the lip 22 whose position has been determined is which lip 22 between the first lip 221 to the third lip 223, and determines whether the shim 23 is which shim 23 between the first shim 233 and the second shim 234. As described above, the sensor module 122 moves in a direction from the first die 211 to the second die 212, and the coordinate value of an edge of each lip 22 is stored. Therefore, if a signal received by the reception part 132 is first changed from the on signal to the off signal, it indicates that a corresponding edge is an edge of the first lip 221 and based on the edge of the lip 221, the first shim 233 is position in the front and the first lip 221 is position at the rear.

Meanwhile, the storage part 14 also stores the reference data on the thickness 11 to 15 of the lip 22 or the shim 23. Therefore, after the determination part 133 determines the position of the lip 22 or the shim 23 as described above, the calculation part 134 derives the coordinate value of the lip 22 or the shim 23 using the stored reference data on the thickness of the lip 22 or the shim 23. From the beginning of manufacturing, there is designed data on the thickness 11 to 15 of the lip 22 or the shim 23 for the manufacturing. In addition, when the lip 22 or the shim 23 is a good product, it has a thickness within an error range of the designed data. Therefore, the reference data on the thickness of the lip 22 or the shim 23 may be the designed data.

The calculation part 134 loads the reference data on the thickness 11 to 15 of the lip 22 or the shim 23 from the storage part 14. Thereafter, a coordinate value of the lip 22 or the shim 23 is derived by calculating half of the thickness of the lip 22 or the shim 23 to the coordinate value of the edge S304. At this time, the calculation is performed by reflecting the position of the lip 22 or the shim 23.

For example, since the first shim 233 is positioned in the front and the first lip 221 is positioned at the rear based on the first edge 2211, the calculation part 134 loads the reference data on the thickness 14 of the first shim 233 and the thickness 11 of the first lip 221 from the storage part 14. In addition, when half of the thickness 14 of the first shim 233 is added to the coordinate value of the first edge 2211, a coordinate value of the center point of the first shim 233 is derived, which is set as a coordinate value of the first shim 233. In addition, when half of the thickness 11 of the first lip 221 is subtracted from the coordinate value of the first edge 2211, a coordinate value of the center point of the first lip 221 is derived, which is set as a coordinate value of the first lip 221.

As in the above manner, the calculation part 134 may derive coordinate values of all the lips 22 and the shims 23 of the die coater 2. In addition, the storage part 14 may store coordinate values of the lip 22 and the shim 23.

Since the coordinate values of the lip 22 and the shim 23 are derived, the sensor module 122 moves to a position corresponding to the coordinate values S305. Thereafter, the distance detection sensor 1222 included in the sensor module 122 measures the height of the lip 22 or the shim 23 at the position S306. The distance detection sensor 1222 measures a distance at which each of the lips 22 or each of the shims 23 is spaced apart from the distance detection sensor 1222. Therefore, the height of the lip 22 or the shim 23 may be a relative height measured based on arbitrary criteria. However, the present invention is not limited thereto, and if the height of the distance detection sensor 1222 from the ground surface is already stored in the storage part 14, the height of the lip 22 or the shim 23 may be an absolute height measured from the ground surface. When the height of each of the lips 22 or the shims 23 is measured by the distance detection sensor 1222 as described above, the measurement data is stored in the storage part 14.

The determination part 133 may determine whether the die coater 2 is defective based on the measurement data of the lip 22 or the shim 23 S306. Specifically, the storage part 14 also stores reference data on the height of the lip 22 or the shim 23. This may also be designed data for the manufacturing of the die coater 2. Then, the determination part 133 loads the reference data on the height of the lip 22 or the shim 23 from the storage part 14. Thereafter, the measurement data on the height of the lip 22 or the shim 23 may be compared with the reference data on the height of the lip 22 or the shim 23 to determine whether the die coater 2 is defective or not. If the measurement data is within an error range after the comparison of the two data, the assembly tolerance of the die coater 2 is not large, so that the determination part 133 determines that the corresponding die coater 2 is a good product. However, if the measurement data is out of the error range after the comparison of the two data, the assembly tolerance of the die coater 2 is large, so that the determination part 133 determines that the corresponding die coater 2 is defective.

Figure 7:
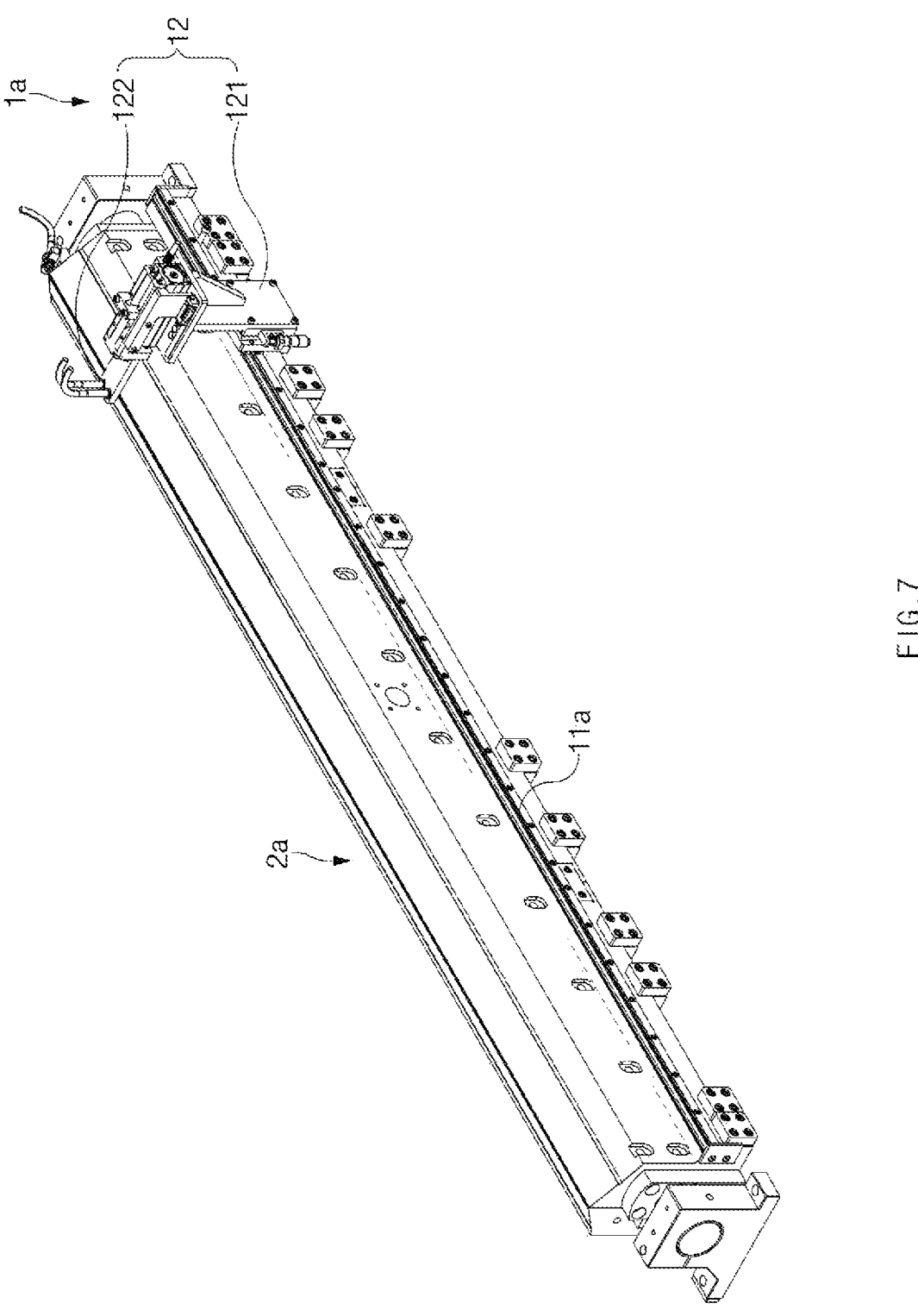
FIG. 7 is a perspective view of a die coater 2a and a die coater inspection device 1a according to another embodiment of the present invention.

FIG. 7 is a perspective view of a die coater 2a and a die coater inspection device 1a according to another embodiment of the present invention.

According to another embodiment of the present invention, as illustrated in FIG. 7, a rail 11a is integrally formed on one surface of a first die 211. Therefore the rail 11a and a die 21 may be more firmly fixed to each other than when formed coupled to each other through a separate coupling part. Therefore it is possible to more reliably prevent the die coater 2a and the rail 11a from being separated or dislocated from each other.

Figure 8:
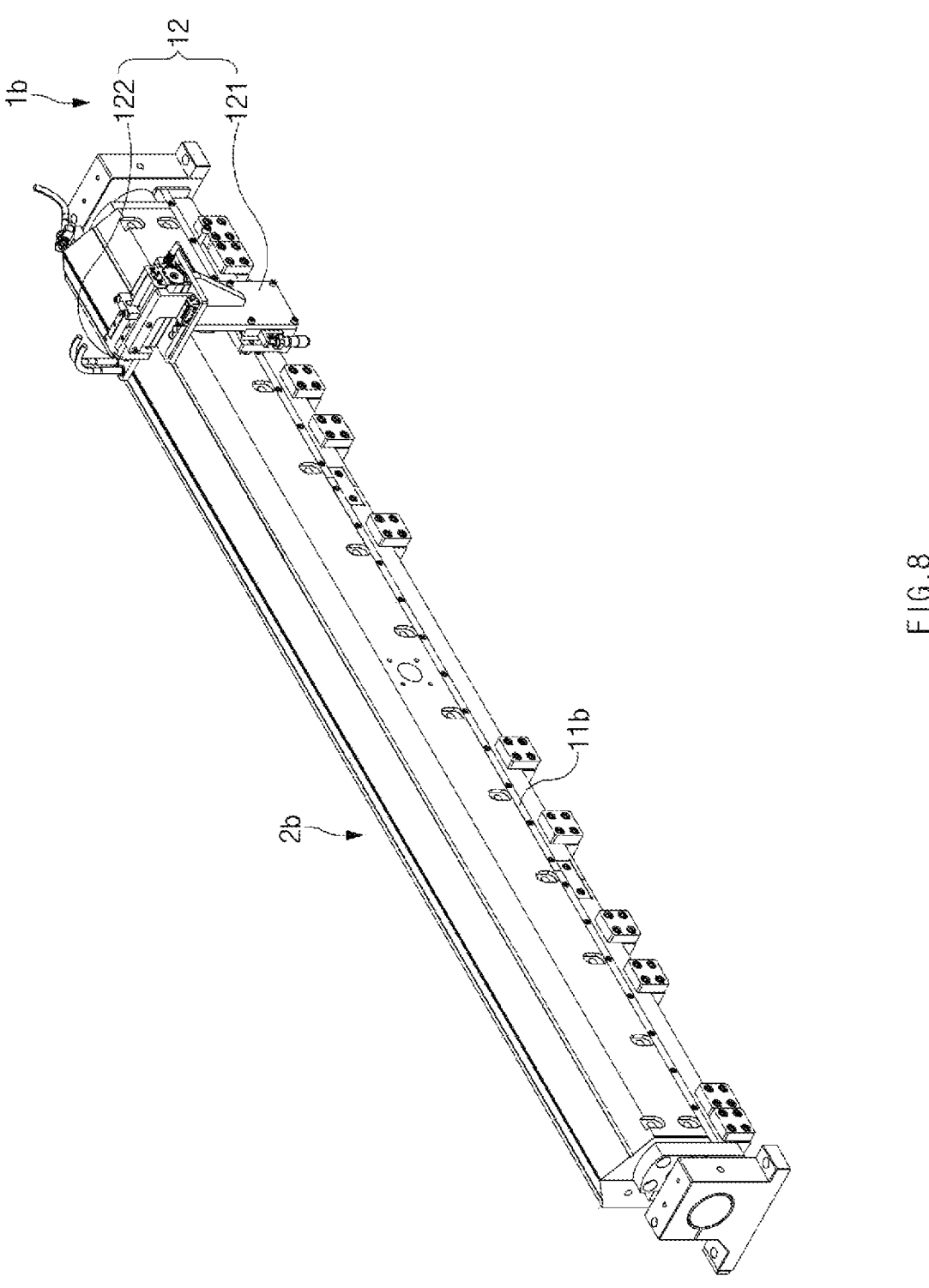
FIG. 8 is a perspective view of a die coater 2b and the die coater inspection device 1 according to further another embodiment of the present invention.

FIG. 8 is a perspective view of a die coater 2b and the die coater inspection device 1 according to further another embodiment of the present invention.

According to another embodiment of the present invention, as illustrated in FIG. 8, a rail 11b is formed buried on one surface of a first die 211. Thus, a volume of the die coater 2b in the thickness direction thereof may be reduced. At this time, the rail 11b and the first die 211 may be integrally formed, but the present invention is not limited thereto. The rail 11b and the first die 211 may be separately formed, or a recessed groove may be formed on one surface of the first die 211 and the rail 11b may be inserted into the groove and then coupled with a separate coupling part.

Figure 9:
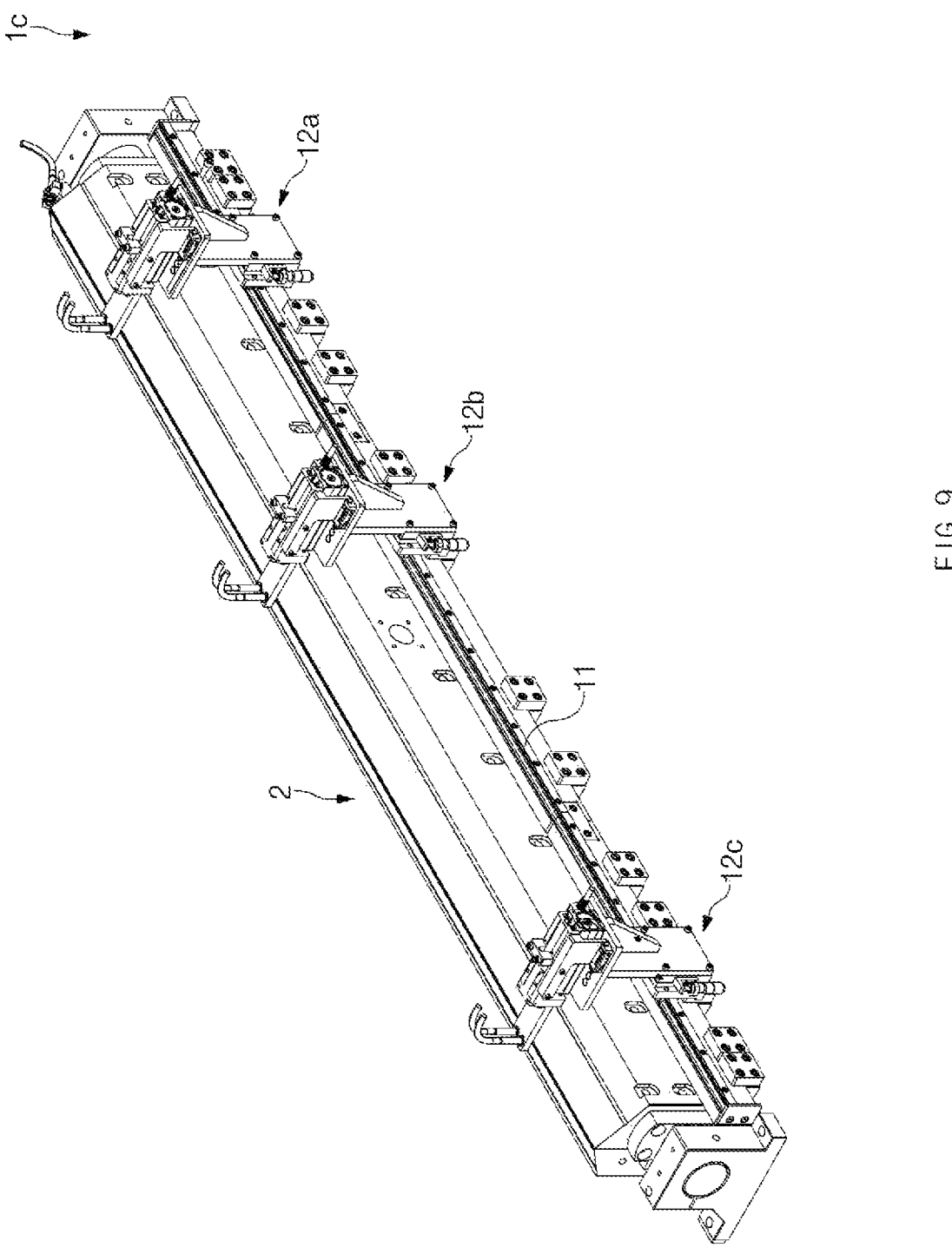
FIG. 9 is a perspective view of the die coater 2 and a die coater inspection device 1c according to further another embodiment of the present invention.

FIG. 9 is a perspective view of the die coater 2 and a die coater inspection device 1c according to further another embodiment of the present invention.

According to further another embodiment of the present invention, as illustrated in FIG. 9, a plurality of sensor assemblies 12a, 12b, and 12c are provided. Therefore the plurality of sensor modules 122 may more quickly inspect a lip 22 or a shim 23 at various locations. FIG. 9 illustrates that three sensor assemblies 12a, 12b, and 12c are formed, but the present invention is not limited thereto. The sensor assemblies 12a, 12b, and 12c may be formed in various numbers.

Figure 10:
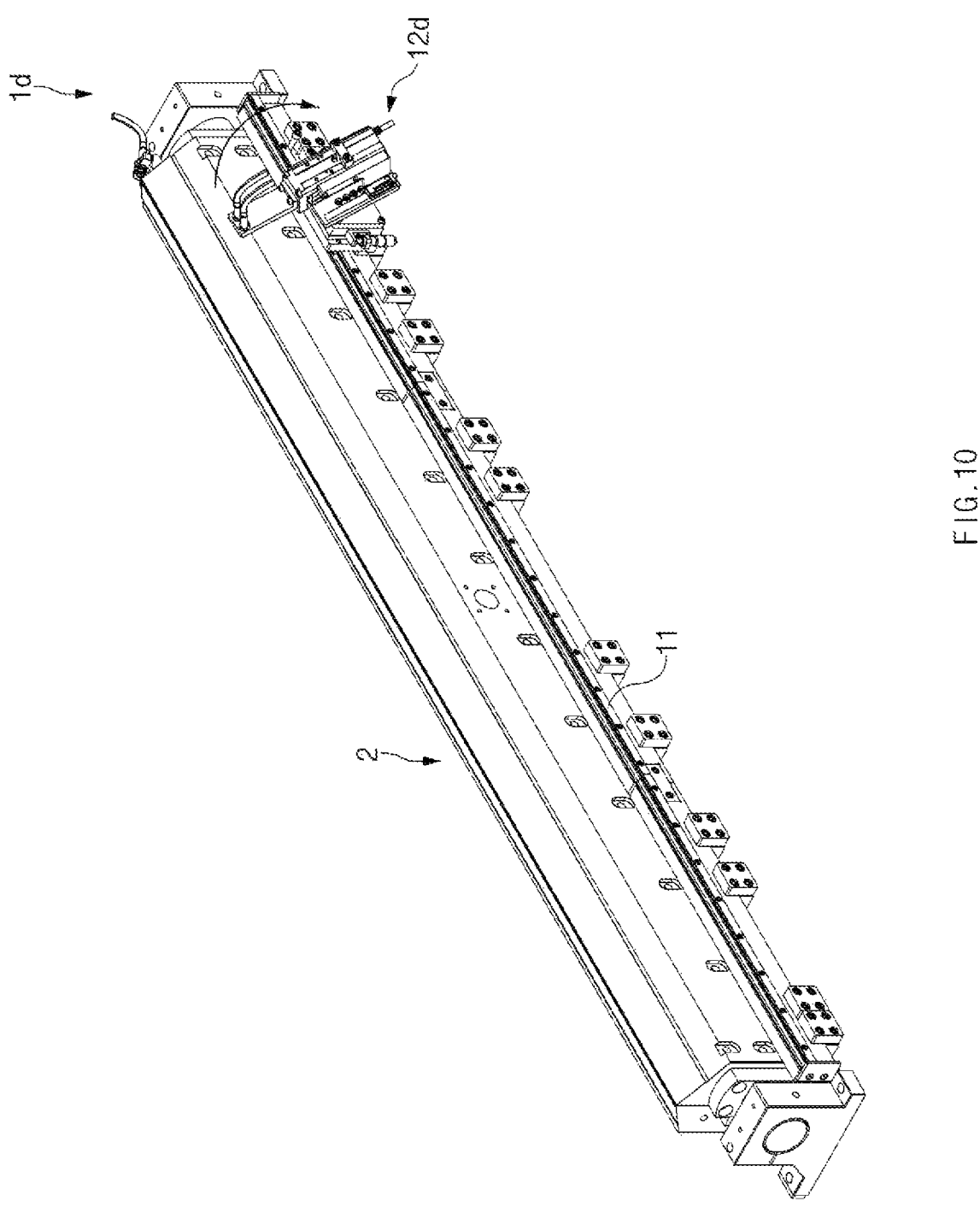
FIG. 10 is a perspective view of the die coater 2 and a die coater inspection device 1d according to further another embodiment of the present invention.

FIG. 10 is a perspective view of the die coater 2 and a die coater inspection device 1d according to further another embodiment of the present invention.

According to further another embodiment of the present invention, as illustrated in FIG. 10, the movable part 121 includes a rotatable part which rotates around an axis parallel to the longitudinal direction of a die coater 2. When the die coater 2 is in the state of being mounted on a production line, a sensor assembly 12d immediately inspects the die coater 2, and then the rotatable part rotates. Therefore the sensor assembly 12d is positioned outside of the die coater 2, and there is no longer an obstacle present between the lip 22 of the die coater 2 and a base material to be coated. Then, the die coater 2 may immediately coat slurry on the base material, so that production efficiency may increase. In addition, when the die coater 2 is inspected again later, the rotatable part rotates in a reverse direction, so that a sensor assembly 12d may be positioned toward the lip 22 of the die coater 2.

Figure 11:
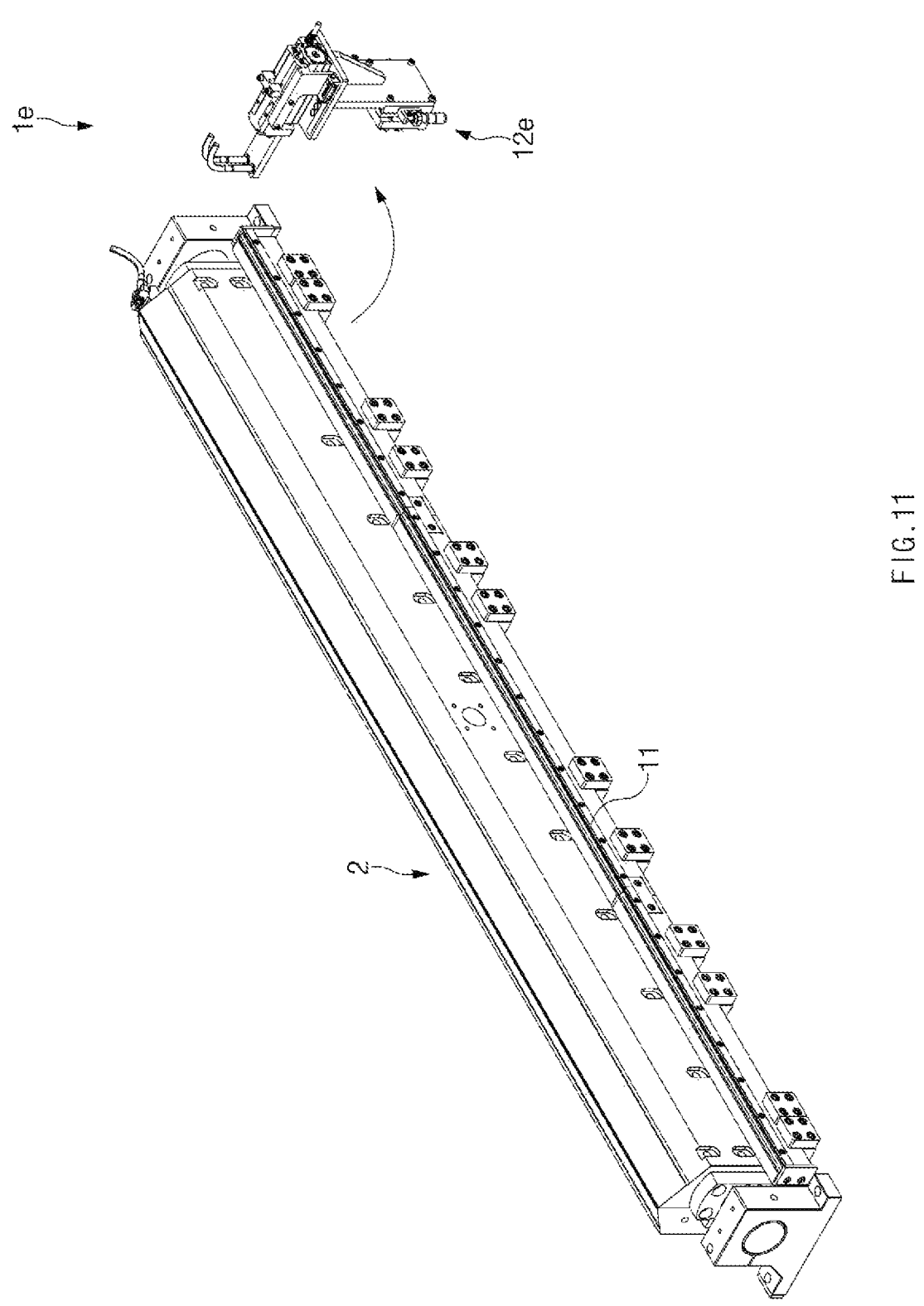
FIG. 11 is a perspective view of the die coater 2 and a die coater inspection device 1e according to further another embodiment of the present invention.

FIG. 11 is a perspective view of the die coater 2 and a die coater inspection device 1e according to further another embodiment of the present invention.

According to further another embodiment of the present invention, as illustrated in FIG. 11, a sensor assembly 12e is detachable from a rail 11. When a die coater 2 is in the state of being mounted on a production line, a sensor assembly

12e inspects the die coater 2, and then the sensor assembly 12e is detached from the rail 11. Therefore there is no longer an obstacle present between a lip 22 of the die coater 2 and a base material to be coated, and the die coater 2 may immediately coat slurry on the base material. In addition, when the die coater 2 is inspected again later, the sensor assembly 12e is mounted on the rail 11 again, so that the sensor assembly 12e may be positioned toward the lip 22 of the die coater 2.

Figure 12:
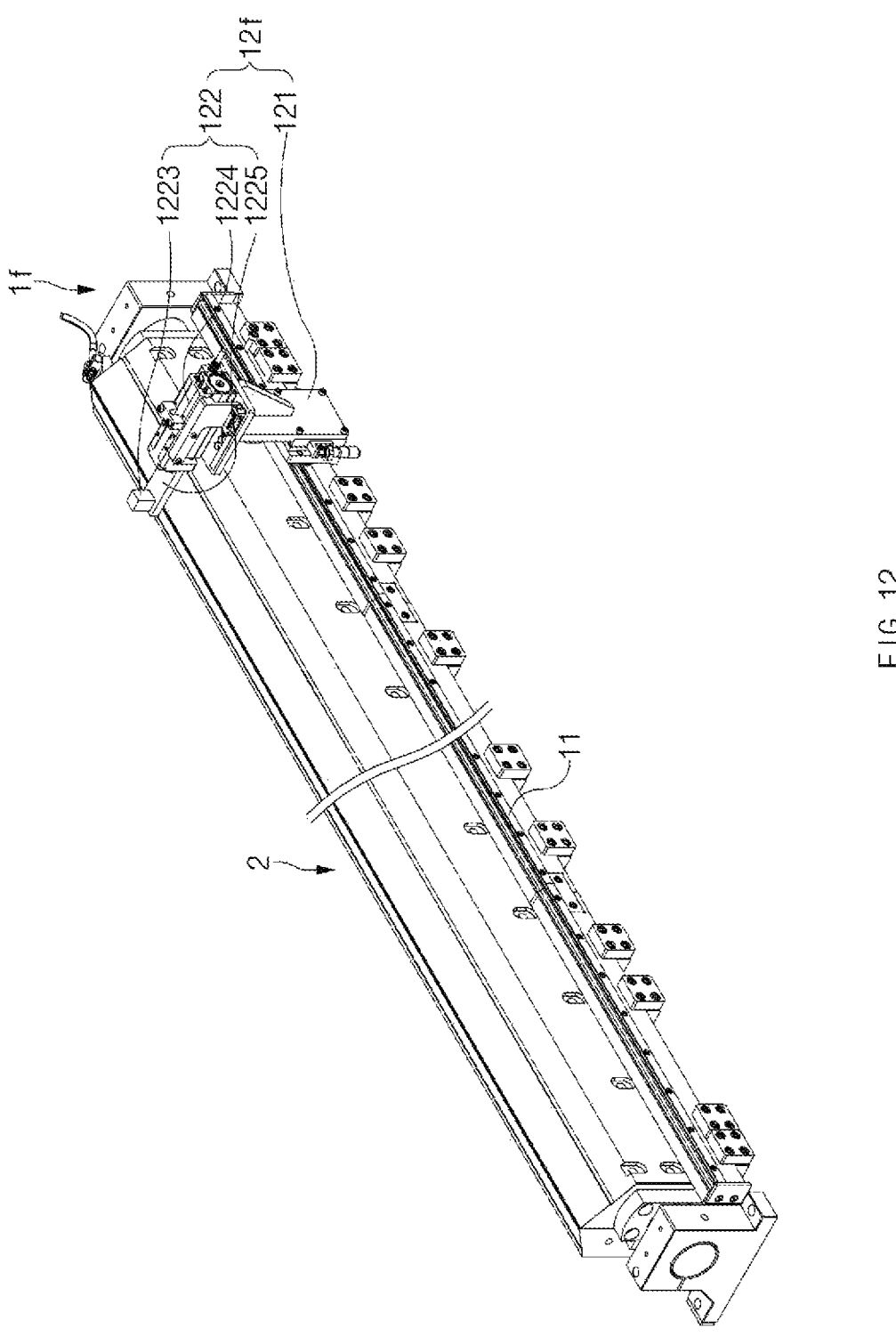
FIG. 12 is a perspective view of the die coater 2 and a die coater inspection device 1f according to further another embodiment of the present invention.
Figure 13:
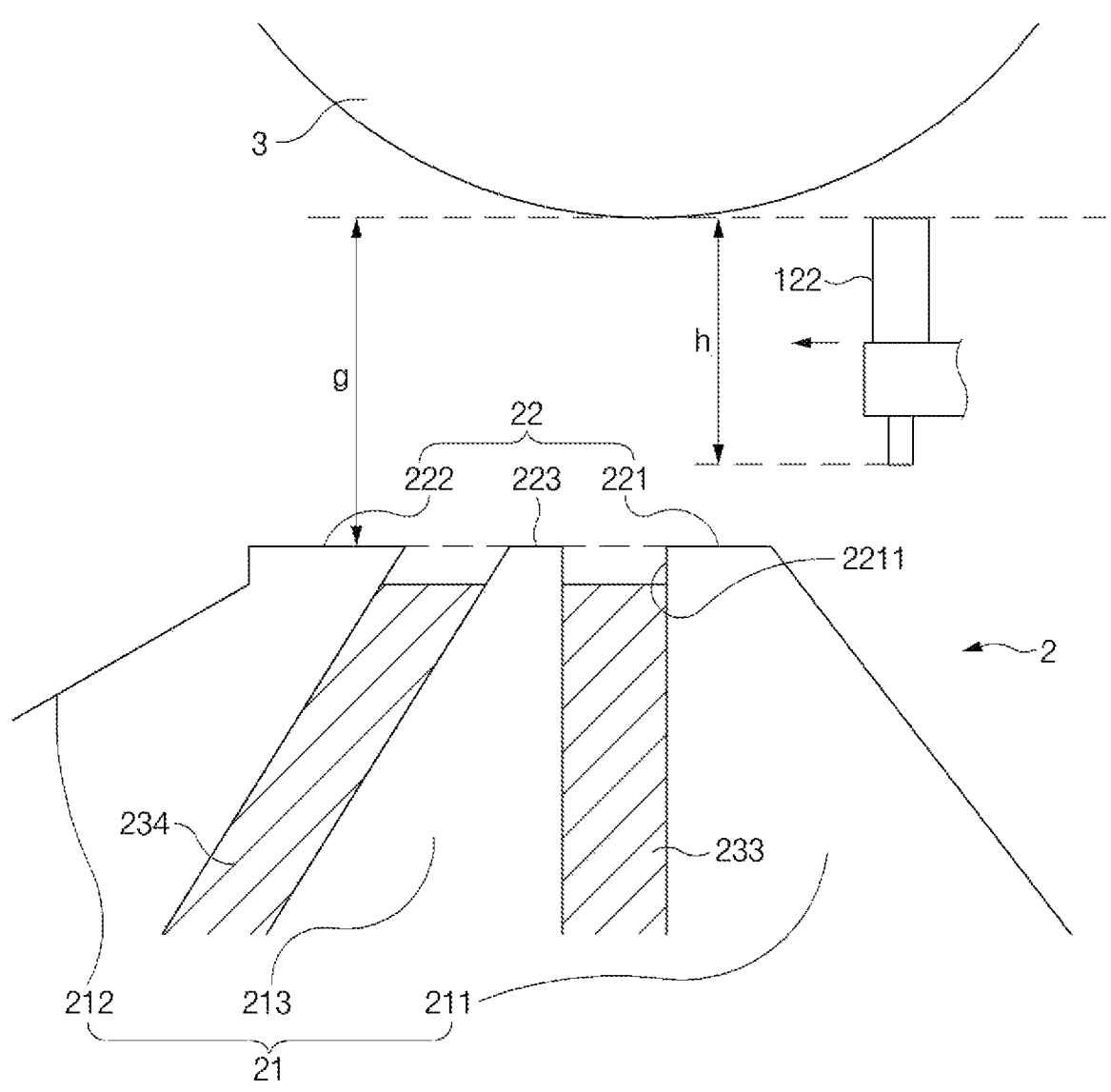
FIG. 13 is an enlarged side view illustrating the die coater 2 of FIG. 12.
Figure 14:
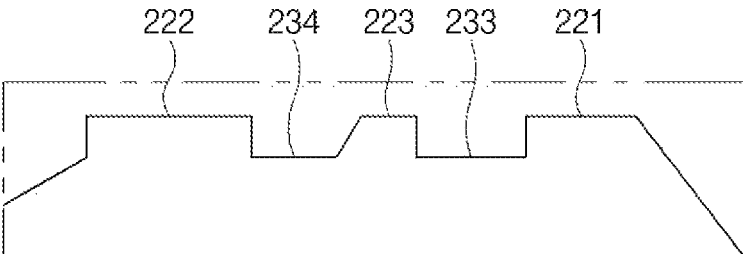
FIG. 14 is a view illustrating a two-dimensionally scanned image of a die coater.

FIGS. 12 to 14 are perspective views of the die coater 2 and a die coater inspection device 1f according to further another embodiment of the present invention.

According to another embodiment of the present invention, as illustrated in FIGS. 12 to 14, at least one sensor assembly 12f moving along the rail 11 and inspecting the lip 22 or the shim 23 of the die coater 2 is provided.

The sensor assembly 12f includes a movable part 121 moving along the rail 11 in the longitudinal direction of the die coater 2, and a sensor module 122 connected to the movable part 121 and inspecting the lip or the shim while moving in the thickness direction of the die coater 2.

The sensor module 122 includes a 2D line sensor 1233 connected to the movable part 121 and scanning a discharge port portion of the die coater 2 to two-dimensionally detect the shape of the lip 22 and the shape of the shim 23 in the width direction of the die coater 2, and an inspection part 1224 comparing a measured height value obtained by measuring the height from an edge of the lip 22 to an edge of the shim 23 detected through the 2D line sensor 1223 with a set height value which has already set to inspect whether defects occur.

The movable part 121 moves along the rail 11 in the longitudinal direction of the die coater 2, and particularly, the movable part 121 may slide and move along the rail 11. To this end, the rail 11 and the movable part 121 may be slidably coupled to each other, and furthermore, at least one of the rail 11 and the movable part 121 may have a wheel or a roller.

The 2D line sensor 1223 scans the die coater 2 in the width direction of the die coater to detect a shape in which the lip 22 and the shim 23, which are included in the die coater 2, are connected, in a two-dimensional image. That is, the 2D line sensor 1223 detects a side surface image of the die coater 2 as illustrated in FIG. 13. In more detail, referring to FIGS. 13 and 14, the 2D line sensor 1223 detects an image in which the first lip 221 of the first die 211 on the right side, the second lip 222 of the second die 212 on the left side, the third lip 223 of the third die 213 between the first and second dies 211 and 212, the first shim 233 between the first die 211 and the third die 213, and the second shim 234 between the third die 213 and the second die 212 are connected in a concave-convex shape.

At this time, the 2D line sensor 1223 is also referred to as a 2D laser displacement sensor or line scanner, and has a wide laser light source is wide, and thus, may measure a shape representing such as the width, area, thickness, height difference, inclination, curve, surface roughness, and degree of wear of a lip or a shim in two dimensions.

Particularly, the 2D line sensor 1223 moves in the longitudinal direction of the die coater 2 by the movable part 121, and accordingly, may detect a shape in which a lip and a shim are connected over the entire die coater 2 in an image.

Meanwhile, a height h of the 2D line sensor should be less than the gap g between the lip 22 and a base material to be coated. This allows the 2D line sensor 1223 to move in the width direction of the die coater 2 even when the die coater 2 is mounted on a production line. Therefore it is possible to immediately inspect the die coater 2 when the die coater 2 is in the state of being mounted on a production line without performing a process of moving the die coater 2 to a separate inspection line to perform measurement, and then moving the same back to the production line. Accordingly, the height h of the 2D line sensor 1223 is less than the gap g between the lip 22 and a base material to be coated. For example, when the gap g between the lip 22 of the die 21 and the base material is approximately 10 cm, the height h of the 2D line sensor 1223 may be less than approximately 8 cm. In addition, it is preferable that the 2D line sensor 1223 moves between the lip 22 and the base material to be coated without being contacted or interfered by another component. Therefore, in order to control the above, the movable part 121 according to an embodiment of the present invention may include a rod for moving the sensor assembly 12*f* in the width direction of the die coater 2.

The inspection part 1224 measures the height between a lip and a shim through an image of the lip and the shim detected through the 2D line sensor 1223, and compares a measured height value measured with a set height value already set to inspect whether there is an assembly defect or not. That is, when the measured height value is within the range of the set height value, the inspection part 1224 determines that there is no defect, and when out of the range, determines that there is an assembly defect.

In more detail, the inspection part 1224 primarily inspects whether there is an assembly defect by comparing a first measured height value obtained by measuring the height between a lip and a first shim with a set height value, and then secondarily inspects whether there is an assembly defect by comparing a second measured height value obtained by measuring the height between the lip and a second shim with the set height value. Accordingly, when both the primary inspection and the secondary inspection show that there is no defect, an assembly is determined to be normal, and when either the primary inspection or the secondary inspection shows that there is a defect, the assembly is determined to be defective.

Meanwhile, the inspection part 1224 inspects the arrangement state of two or more dies using the two-dimensional image of the shape in which the lip 22 and the shim 23 are connected detected though the 2D line sensor 1223. That is, the inspection part 1224 inspects whether the first lip 221, the second lip 222, and the third lip 223 are positioned on the same horizontal line, and at this time, when any of the lips is not positioned on the same horizontal line, determines that there is an assembly defect.

Meanwhile, the inspection part 1224 inspects whether lips (that is, the first and second lips) provided in two or more dies 21 are positioned on the same horizontal line by using a two-dimensional image shape with respect to the edge of the lip 22 detected through the 2D line sensor 1223. That is, when the first lip and the second lip are not positioned on the same horizontal line, the inspection part 1224 determines that there is an assembly defect.

Meanwhile, the inspection part 1224 measures the thickness of the shim 23 using a two-dimensional image shape with respect to the edge of the lip 22 and the edge of the shim 23 detected through the 2D line sensor 1223, and inspects a discharge gap through the thickness of the shim 23. That is, when a measured discharge gap and a set discharge gap do not match, the inspection part 1224 determines that there is an assembly defect.

Meanwhile, the inspection part 1224 may inspect surface roughness by enlarging a two-dimensional image shape of the lip 22 and the shim 23 detected through the 2D line sensor 1223. At this time, the inspection part 1224 may determine that there is a defect when the surface roughness of the lip and the shim exceeds a set value.

Meanwhile, in the sensor assembly 12*f*, the 2D line sensor 1223 scans the die coater 2 every set time to continuously detect the shape of the edge of the lip 22 and the shape of the edge of the shim 23, and the inspection part 1224 inspects the degree of wear of the die 21 and the shim 23 by a change in position with respect to the edge of the lip 22 or a change in position with respect to the edge of the shim 23 continuously measured through the 2D line sensor 1223. Here, the inspection part 1224 may inspect the surface roughness of the die and the shim through surface roughness with an image of the lip and the shim measured through the 2D line sensor 1223.

Meanwhile, the sensor assembly 12*f* may further include a moving rod 1225 which moves the 2D line sensor 1223 in the width direction of the die coater 2 such that the 2D line sensor 1223 may scan from one end to the other end in the width direction of the die coater 2. Accordingly, the 2D line sensor 1223 may stably and entirely scan in the width direction of the die coater 2.

Meanwhile, it is preferable that a central processing unit (CPU), a micro controller unit (MCU), a digital signal processor (DSP) or the like is used as the control part 1224, but various logical operation processors may be used without being limited thereto.

Those of ordinary skill in the art to which the present invention pertains will understand that the present invention may be embodied in other specific forms without changing the technical spirit or essential features thereof. It is therefore to be understood that the above-described embodiments are illustrative in all aspects and not restrictive. The scope of the present invention is represented by the following claims rather than the above detailed description, and various embodiments derived from the meaning and scope of the claims and their equivalent concepts should be construed as being included in the scope of the present invention.

DESCRIPTION OF THE REFERENCE SYMBOLS

1: Inspection device
2: Die coater
3: Roller
11: Rail
12: Sensor assembly
13: Control part
14: Storage part
21: Die
22: Lip
23: Shim
121: Movable part
122: Sensor module
1221: Position detection sensor
1222: Distance detection sensor
1223: 2D line sensor
1224: Inspection part
131: First encoder
132: Reception part
133: Determination part
134: Calculation part
135: Second encoder
211: First die
212: Second die
213: Third die
221: First lip

222: Second lip
223: Third lip
231: Guide
232: Base
233: First shim
234: First shim
2211: First edge
2231: Second edge
The invention claimed is:

1. A die coater inspection device for inspecting a die coater comprising a first die, a second die, and a shim formed between the first die and the second die, the die coater inspection device comprising:
   a rail formed to be fixed long on one surface of the first die in a longitudinal direction of the die coater; and
   at least one sensor assembly configured to move along the rail and inspect a lip or the shim of the die coater,
   wherein the sensor assembly comprises:
      a movable part configured to move along the rail in the longitudinal direction of the die coater; and
      a sensor module connected to the movable part, and configured to move in a thickness direction of the die coater and inspect the lip or the shim.

2. The die coater inspection device of claim 1, wherein the sensor module comprises:
   a position detection sensor configured to detect a position of the lip; and
   a distance detection sensor configured to measure a height of the lip or the shim.

3. The die coater inspection device of claim 2, wherein the position detection sensor comprises at least one of a fiber optic sensor, a photo sensor, a proximity sensor, or a vision sensor; and
   the distance detection sensor comprises at least one of a laser displacement sensor or an ultrasonic displacement sensor.

4. The die coater inspection device of claim 2, wherein the shim comprises:
   at least one guide configured to divide an internal space between the first die and the second die into a plurality of spaces; and
   a base configured to connect ends of the guide to each other and extending in a longitudinal direction of the die coater.

5. The die coater inspection device of claim 4, wherein the position detection sensor is configured to moves along a first path in which the guide is not present; and
   the distance detection sensor is configured to moves along a second path in which the guide is present.

6. The die coater inspection device of claim 2, further comprising:
   a control part configured to control an operation of the sensor assembly; and
   a storage part in which reference data on the thickness of the lip or the shim is stored.

7. The die coater inspection device of claim 6, wherein the control part comprises:
   a first encoder configured to recognize a coordinate value of the sensor module whenever the sensor module moves in the thickness direction of the die coater;
   a reception part configured to receive a signal transmitted by the position detection sensor;
   a determination part configured to determine the position of the lip or the shim according to the signal received by the reception part; and
   a calculation part configured to perform calculation based on the position of the lip or the shim and the coordinate value so as to derive a coordinate value of the lip or a coordinate value of the shim.

8. The die coater inspection device of claim 7, wherein, when detecting an edge of the lip, the position detection sensor is configured to changes the signal transmitted to the reception part from a first signal to a second signal.

9. The die coater inspection device of claim 8, wherein, when the first signal is changed to the second signal, the first encoder is configured to recognizes the coordinate value of the sensor module as a coordinate value of the edge.

10. The die coater inspection device of claim 9, wherein the storage part is configured to stores the coordinate value of the edge recognized by the first encoder.

11. The die coater inspection device of claim 9, wherein, when the reception part receives the second signal, the determination part is configured to determines the position of the lip or the shim using the edge as a boundary.

12. The die coater inspection device of claim 9, wherein the calculation part is configured to loads the reference data on the thickness of the lip or the shim from the storage part and calculates reference data on the coordinate value of the edge and the thickness of the lip or the shim by reflecting the position of the lip or the shim to derive the coordinate value of the lip or the shim.

13. The die coater inspection device of claim 12, wherein the calculation part is configured to calculates half of the thickness of the lip or the shim to the coordinate value of the edge to derive the coordinate value of the lip or the shim.

14. The die coater inspection device of claim 7, wherein the control part further comprises a second encoder configured to recognize a coordinate value of the movable part whenever the movable part moves along the rail in the longitudinal direction of the die coater.

15. The die coater inspection device of claim 1, wherein the sensor module comprises:
   a 2D line sensor configured to scan the die coater so as to two-dimensionally detect a shape of the lip and the shim in a width direction of the die coater; and
   an inspection part configured to compare a measured height value from an edge of the lip to an edge of the shim detected through the 2D line sensor with a set height value to inspect whether defects occur.

16. The die coater inspection device of claim 15, wherein the inspection part is configured to measure the thickness of the shim using the edge of the lip and the edge of the shim detected through the 2D line sensor, and inspect a discharge gap through the thickness of the shim.

17. The die coater inspection device of claim 15, wherein the 2D line sensor is configured to scan the die coater every set time so as to continuously detect the shape of the edge of the lip and the shape of the edge of the shim; and
   the inspection part is configured to inspect a degree of wear of the die and the shim by a change in position with respect to the edge of the lip or a change in position with respect to the edge of the shim continuously measured through the 2D line sensor.

18. A die coater comprising:
   a first die and a second die configured to supply slurry to an outside; and
   a shim formed between the first die and the second die, wherein a rail is formed to be fixed long on one surface of the first die in a longitudinal direction.

19. The die coater of claim 18, further comprising:
   at least one sensor assembly configured to move along the rail and inspect a lip or the shim; and
   a control part configured to control an operation of the sensor assembly, wherein the sensor assembly comprises:

a movable part configured to move along the rail in a longitudinal direction; and a sensor module connected to the movable part, configured to move in a thickness direction, and configured to inspect the lip.

20. The die coater of claim 19, wherein the sensor module comprises:

a position detection sensor configured to detect a position of the lip; and a distance detection sensor configured to measure the height of the lip or the shim.

\* \* \* \* \*